(12) United States Patent
Silverstein et al.

(10) Patent No.: US 11,718,726 B2
(45) Date of Patent: Aug. 8, 2023

(54) SUPERABSORBENT STRUCTURE

(71) Applicant: Technion Research & Development Foundation Limited, Haifa (IL)

(72) Inventors: Michael S. Silverstein, Zikhron-Yaakov (IL); Tao Zhang, Nesher (IL)

(73) Assignee: Technion Research & Development Foundation Limited, Haifa (IL)

( * ) Notice: Subject to any disclaimer, the term of this patent is extended or adjusted under 35 U.S.C. 154(b) by 452 days.

(21) Appl. No.: 17/045,506

(22) PCT Filed: Apr. 25, 2019

(86) PCT No.: PCT/IL2019/050465
§ 371 (c)(1),
(2) Date: Oct. 6, 2020

(87) PCT Pub. No.: WO2019/211831
PCT Pub. Date: Nov. 7, 2019

(65) Prior Publication Data
US 2021/0189092 A1 Jun. 24, 2021

(30) Foreign Application Priority Data
May 1, 2018 (IL) .......................................... 259063

(51) Int. Cl.
*C08J 9/28* (2006.01)
*C08F 293/00* (2006.01)

(52) U.S. Cl.
CPC ............. *C08J 9/283* (2013.01); *C08F 293/00* (2013.01); *C08J 2201/026* (2013.01);
(Continued)

(58) Field of Classification Search
CPC .................. C08J 9/283; C08J 2201/026; C08J 2201/028; C08J 2201/054; C08J 2205/05;
(Continued)

(56) References Cited

U.S. PATENT DOCUMENTS

2019/0153190 A1* 5/2019 Seo .................. C08J 9/0061

FOREIGN PATENT DOCUMENTS

| CN | 105884952 | 8/2016 |
|---|---|---|
| IL | 245656 | 5/2018 |

(Continued)

OTHER PUBLICATIONS

Zhang et al."High internal phase emulsion (HIPE) organogels prepared from charge-driven assembled polymer organogels"Chem. Commun., 2013, 49, 11803-11805. (Year: 2013).*
(Continued)

*Primary Examiner* — Michael M Dollinger
*Assistant Examiner* — Christina H. W. Rosebach

(57) ABSTRACT

Provided is a superabsorbent structure based on a covalently crosslinked copolymer having a microstructure of a HIPE, and characterized by hydrophobic and hydrophilic segments of at least five residues; the unique chemical and structural properties of the copolymer afford a polymeric superabsorbent structure that is capable of swelling in polar as well as apolar media. Also provided are processes of manufacturing the superabsorbent structure, and uses thereof.

20 Claims, 13 Drawing Sheets

(52) U.S. Cl.
CPC .. *C08J 2201/028* (2013.01); *C08J 2201/0543* (2013.01); *C08J 2205/05* (2013.01); *C08J 2207/10* (2013.01); *C08J 2207/12* (2013.01); *C08J 2371/02* (2013.01)

(58) Field of Classification Search
CPC ............... C08J 2207/10; C08J 2207/12; C08J 2371/02; C08F 293/00
See application file for complete search history.

(56) References Cited

FOREIGN PATENT DOCUMENTS

| WO | WO 2006/054288 | 5/2006 |
|----|----------------|--------|
| WO | WO 2018/002916 | 1/2018 |
| WO | WO 2012/11831  | 11/2019 |
| WO | WO 2019/211831 | 11/2019 |

OTHER PUBLICATIONS

Wu et al. "High internal phase emulsion (HIPE) xerogels for enhanced oil spill recovery". J mater chem a 2015, 3, pp. 1906-1909 (Year: 2015).*

Elliott "Superabsorbent Polymers", BASF Aktiengesellschaft, Product Development Scientist for SAP, p. 1-13, 2004 (Year: 2004).*

Machine translation of CN 105884952 (Year: 2016).*

International Search Report and the Written Opinion dated Jun. 26, 2019 From the International Searching Authority Re. Application No. PCT/IL2019/050465. (16 Pages).

Office Action and Search Report dated Nov. 14, 2018 From the Israel Patent Office Re. Application No. 259063. (6 Pages).

Elliott "Superabsorbent Polymers", BASF Aktiengesellschaft, Product Development Scientist for SAP, p. 1-13, 2004.

Kapilov-Buchman et al. "Hierarchically Porous Carbons From an Emulsiontemplated, Urea-Based Deep Eutectic", Journal of Materials Chemistry A, 5: 16376-16385, May 15, 2017.

Kovacic et al. "Hydrogels Through Emulsion Templating: Sequential Polymerization and Double Networks", Polymer Chemistry, 8(40): 6319-6328, Sep. 22, 2017.

Kovacic et al. "Superabsorbent, High Porosity, PAMPS-Based Hydrogels Through Emulsion Templating", Macromolecular Rapid Communications, 37(22): 1814-1819, Sep. 26, 2016.

Madhusudhana Rao et al. "Bicontinuous Highly Cross-Linked Poly(Acrylamide-Co-Ethyleneglycol Dimethacrylate) Porous Materials Synthesized Within High Internal Phase Emulsions", Soft Matter, XP055560837, 7(22): 10780-10786, Published Online Sep. 28, 2011.

Mai et al. "Self-Assembly of Block Copolymers", Chemical Society Reviews, 41(18): 5969-5985, Published Online Jul. 9, 2012.

Serpico et al. "Transport and Structural Studies of Sulfonated Styrene-Ethylene Copolymer Membranes", Macromolecules, 35(15): 5916-5921, Published on Web Jun. 21, 2002.

Silverstein "Emulsion-Templated Polymers: Contemporary Contemplations", Polymer, 126: 261-282, Published Online Jul. 19, 2017.

Silverstein "Emulsion-Templated Porous Polymers: A Retrospective Perspective", Polymer, 55(1): 304-320, Available Online Sep. 11, 2013.

Vandenhaute et al. "Cross-Linkable. Thermo-Respnsive Pluronic® Building Blocks for Biomedical Applications: Synthesis and Physico-Chemical Evaluation", European Polymer Journal, 53: 126-138, Available Online Jan. 30, 2014.

Wu et al. "High Internal Phase Emulsion (HIPE) Xerogels for Enhanced Oil Spill Recovery", Journal of Materials Chemistry A, 3(5): 1906-1909, Published Online Dec. 16, 2014.

Zhang et al. "Doubly-Crosslinked, Emulsion-Templated Hydrogels Through Reversible Metal Coordination", Polymer, 126: 386-394, Published Online Jul. 18, 2017.

Zhang et al. "High Internal Phase Emulsion (HIPE) Organogels Prepared From Charge-Driven Assembled Polymer Organogels", Chemical Communications, 49(100): 11803-11805, Published Online Oct. 25, 2013.

Zhang et al. "Microphase-Separated Macroporous Polymers From an Emulsion-Templated Reactive Triblock Copolymer", Macromolecules, XP055597263, 51(10): 3828-3835, May 10, 2018.

* cited by examiner

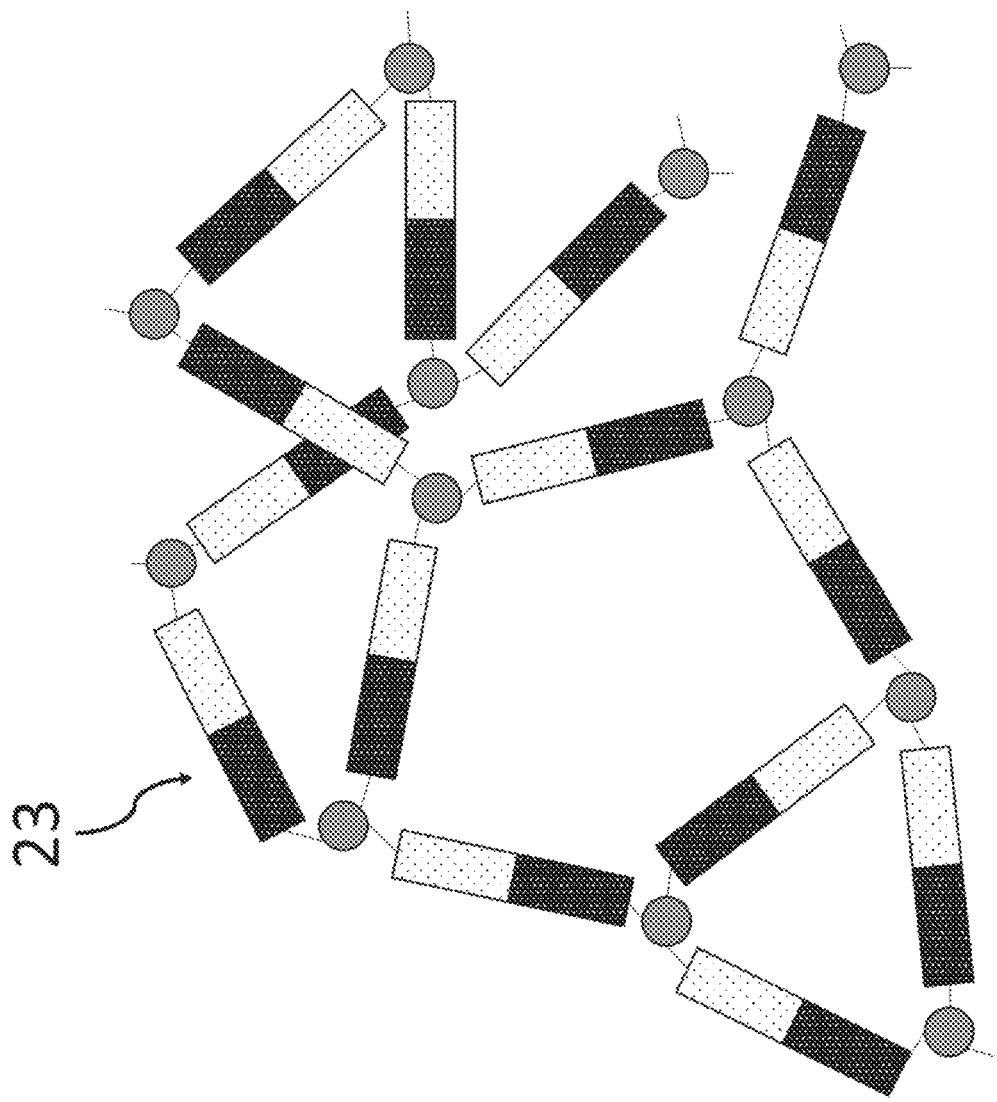
FIG. 1B
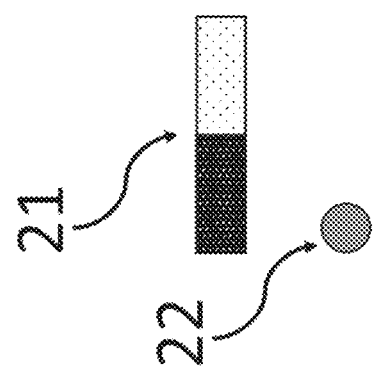

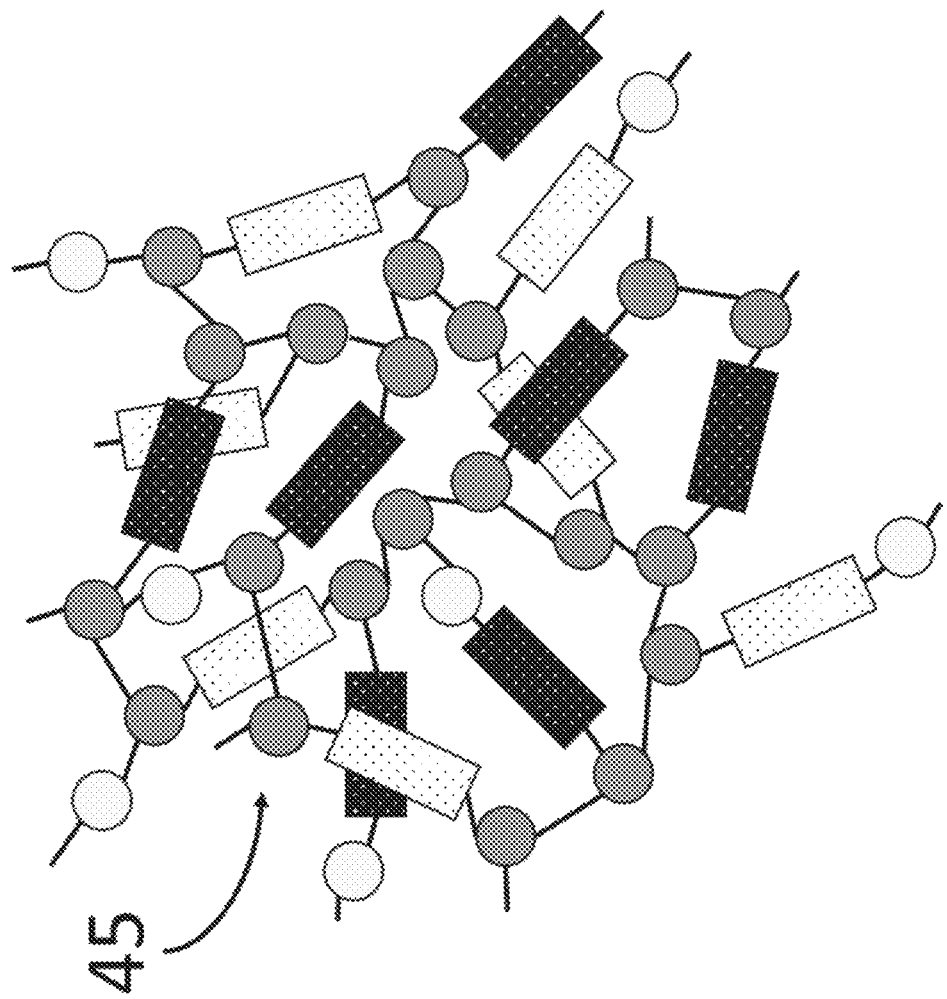
FIG. 1D
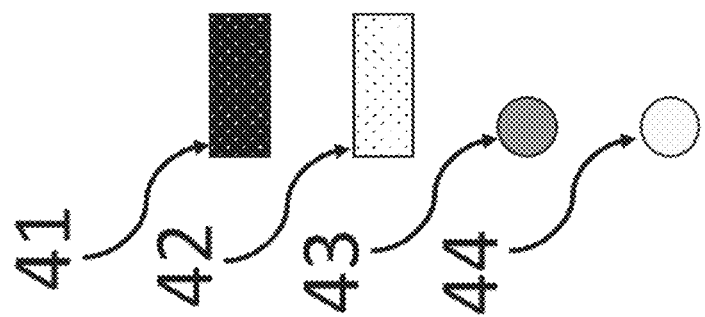

SUPERABSORBENT STRUCTURE

RELATED APPLICATION/S

This application claims the benefit of priority of Israeli Patent Application No. 259063, filed 1 May 2018, the content of which is incorporated herein by reference in its entirety.

FIELD AND BACKGROUND OF THE INVENTION

The present invention, in some embodiments thereof, relates to material science, and more particularly, but not exclusively, to polyHIPE-based structures capable of absorbing polar and non-polar liquids.

Porous polymeric materials have multitudes of uses and applications in almost every aspect of life, from insulation to living tissue scaffolds, from textile and consumer products to industrial and agricultural projects, from leisure and play to medical and pharmaceutical, and the likes. Uptake of liquids constitutes a major parameter in the aforementioned applications, in other applications today, and in applications that will be probably developed in the future. Families of porous polymeric structures, generally known as polyHIPEs (PHs), have been synthesized by polymerizing the external phases of high internal phase emulsions (HIPEs), such that the emulsions act as templates for the porous structures. These porous polymeric structures include both hydrophobic polymers synthesized within water-in-oil (W/O) emulsions and hydrophilic polymers synthesized within oil-in-water (O/W) emulsions. The types of materials synthesized include copolymers, interpenetrating polymer networks (IPNs), biodegradable materials, organic-inorganic hybrids that can be pyrolyzed to porous inorganics, nanocomposites, and hydrophobic-hydrophilic bicontinuous polymers [see, for example: Silverstein, M S, "*Emulsion-templated porous polymers: A retrospective perspective*", Polymer, 2014, 55(1), pp. 304-320].

U.S. Patent Application Publication Nos. 2015166753 and 20130324627 teach polymeric foams and elastomer/hydrogel bicontinuous composite structures derived from high internal phase emulsions and possessing shape-memory characteristics, as well as processes for forming the same and uses thereof.

WO2018002916 teaches a HIPE-templated composition-of-matter afforded by interfacial polymerization, comprising a polymer of alternating residues of hydrophobic and hydrophilic monomers. The described composition-of-matter is characterized by an open-, quasi-closed- or a truly closed-cell microstructure, whereas the latter is capable of non-releasably or releasably encapsulating an organic or aqueous composition therein for extended periods, as well as various uses thereof.

WO2018033913 teaches a polyHIPE-based substance-releasing system capable of releasably encapsulating a highly concentrated solution and/or a room temperature solid while minimizing or avoiding burst release from the closed-cell microstructure of an elastic polyHIPE.

Enhancing the hydrophilicity of hydrophobic polyHIPEs, synthesized in water-in-oil (W/O) HIPEs, can be achieved through surface modification or through the generation of more complex macromolecular structures such as bicontinuous hydrophilic-hydrophobic PHs. Conventional hydrogel polyHIPEs (HG-PHs), usually synthesized within oil-in-water (O/W) HIPEs, preferentially absorb hydrophilic liquids. Previous work on HG-PHs has demonstrated that both the extent of crosslinking and the macromolecular structure can affect the water uptake [Kulygina, O. and Silverstein, M S., "*Porous poly(2-hydroxyethyl methacrylate) hydrogels synthesized within high internal phase emulsions*" Soft Matter, 2007, 3, pp. 1525-1529]. The water uptake in HG-PHs based on an anionic comonomer has been shown to increase with decreasing polyHIPE density and with decreasing polyHIPE crosslinking. Advances in the synthesis of polyHIPEs within o/w HIPEs include the synthesis of complex macromolecular structures including double networks, doubly-crosslinked networks, and polymers from deep eutectics.

Block copolymers (BCs) consist of at least two chemically different homopolymer blocks, connected by covalent linkages directly or via a junction unit. Amphiphilic BCs, containing both hydrophilic and hydrophobic blocks, function as surfactants and are advantageous in self-assembly applications. Amphiphilic BCs have been used to stabilize HIPEs with the most common BCs triblock copolymers consisting of poly(ethylene oxide) (PEO) end blocks and a poly(propylene oxide) (PPO) midblock, or in short, PEO-PPO-PEO. These BCs do not react during radical polymerization, thus they do not become part of the polyHIPE, neither as main-chain elements nor as side-chain elements, and can therefore be removed by extraction following polyHIPE synthesis.

Reactive BCs have been developed for HIPE stabilization. Such surfactants are incorporated in the polyHIPE's void surfaces since they occupy the oil-water interface, thus forming a three-dimensional modification of the polyHIPE surface. Some reactive BCs incorporate a chain transfer agent (CTA) or a polymerization-controlling agent. These reactive BC surfactants covalently incorporate into the polyHIPEs' macromolecular structure via chain-transfer or initiation reactions [Mathieu, K. et al., Polym. Chem., 2017, 8, pp. 1850-1861 and Khodabandeh, A. et al., Polym. Chem., 2016, 7, pp. 1803-1812].

Previous work on BC-based, emulsion-templated porous polymers showed that emulsion-templated porous polymers could be fabricated from a BC alone [Zhang, T. et al., Chem. Commun., 2013, 49, pp. 11803-11805; Zhang, T. et al., Chem. Commun., 2014, 50, pp. 13821-13824; and Wu, Y. et al., J. Mater. Chem. A, 2015, 3, pp. 1906-1909]; however, these porous polymers were relatively fragile and underwent a collapse of their emulsion-templated, monolithic, porous structures.

SUMMARY OF THE INVENTION

Provided herein is a superabsorbent structure capable of swelling in, and absorbing polar media as well as apolar media, which includes a network of crosslinked copolymer having a microstructure templated by an external phase of a high internal phase emulsion (HIPE) and main-chain hydrophobic and hydrophilic sections.

According to an aspect of some embodiments of the present invention, there is provided a superabsorbent structure, which includes a crosslinked copolymer having a microstructure templated by an external phase of a high internal phase emulsion (HIPE), wherein the crosslinked copolymer is characterized by:

a) a network of crosslinked chains, the crosslinked chains comprise hydrophobic sections and hydrophilic sections, each of the sections is a continuous chain of at least five residues long;

b) a ratio of residues of the hydrophilic sections to residues of the hydrophobic sections, ranging from 1:9 to 9:1; and c) a total of the residues of the hydrophilic sections and the residues of the hydrophobic sections that is at least 30% of a total of residues in the network, the crosslinked copolymer is capable of swelling in a polar medium and in an apolar medium.

In some embodiments, at least a part of the sections are copolymers.

In some embodiments, at least a part of the sections are homopolymers.

In some embodiments, the network includes contiguous chains of at least one hydrophilic section and at least one hydrophobic section.

In some embodiments, the contiguous chains are separated by at least one residue of a crosslinking monomer.

In some embodiments, the contiguous chain is selected from the group consisting of a diblock copolymer, a triblock copolymer, and an alternating multiblock copolymer.

In some embodiments, the triblock copolymer includes two of the hydrophilic sections separated by the hydrophobic section.

In some embodiments, each of the sections is at least 60 residues long.

In some embodiments, the ratio of residues of the hydrophilic sections to residues of the hydrophobic sections, is about 3:1.

In some embodiments, structure presented herein has an open-cell microstructure.

In some embodiments, structure presented herein has a density of less than 0.4 g cm$^{-3}$.

In some embodiments, the density is higher than 0.14 g cm$^{-3}$.

According to an aspect of some embodiments of the present invention, there is provided a swollen structure that includes the superabsorbent structure presented herein, and a polar medium and/or a apolar medium absorbed thereby.

In some embodiments, the apolar medium includes a major solvent selected from the group consisting of toluene, pentane, hexane, benzene and DCM.

In some embodiments, the polar medium is selected from the group consisting of water, acetone, N,N-dimethylformamaide (DMF), ethanol, and methanol.

In some embodiments, the swollen structure is characterized by an equilibrium volumetric uptake of at least 20 mL of water to gram of superabsorbent structure.

In some embodiments, the swollen structure is characterized by an equilibrium volumetric uptake of at least 15 mL of ethanol to gram of the superabsorbent structure.

In some embodiments, the swollen structure is characterized by an equilibrium volumetric uptake of at least 40 mL toluene to gram of the superabsorbent structure.

In some embodiments, the swollen structure is characterized by an equilibrium volumetric uptake of at least 70 mL of DCM to gram of the superabsorbent structure.

In some embodiments, the swollen structure is characterized by a water uptake at 50° C. of less than 40% of the water uptake of the swollen structure at 5° C.

According to an aspect of some embodiments of the present invention, there is provided an article of manufacturing that includes the superabsorbent structure presented herein.

In some embodiments, the article is selected from the group consisting of a basic solution retention device, an acidic solution retention device, a cosmetic product, a diaper, a filter material, matrix or device, a flood/spill control material or device, a grooming product, a liquid waste material or device, a personal care and/or hygiene product, a surgical pad, a water purification material, matrix or device, a water retention material or containing device, a wound dressing, an incontinence garment, and an ion-exchange material, matrix or device.

According to an aspect of some embodiments of the present invention, there is provided a process of preparing the superabsorbent structure presented herein, the process is effected by subjecting a high internal phase emulsion (HIPE), having an internal phase and an external phase to polymerization of the external phase, wherein the internal phase and/or the polymerizable external phase includes a plurality of polymerizable precursors of the sections.

In some embodiments, the external phase is an aqueous external phase and the internal phase is an organic internal phase.

In some embodiments, the aqueous external phase includes the plurality of polymerizable precursors of the sections.

In some embodiments, the polymerizable precursors of the sections includes at least one bifunctional end-group.

In some embodiments, the polymerizable precursors of the sections includes two bifunctional end-groups.

In some embodiments, the HIPE further includes a plurality of monomers.

In some embodiments, the HIPE is essentially devoid of a crosslinking agent that is not a part of the plurality of polymerizable precursors.

In some embodiments, the HIPE further includes at least one crosslinking agent.

In some embodiments, the HIPE is essentially devoid of a HIPE-stabilizing agent that is not a part of the plurality of polymerizable precursors.

In some embodiments, the HIPE further includes a HIPE-stabilizing agent.

In some embodiments, the external phase is an aqueous external phase that includes the plurality of polymerizable precursors of the sections, each of the polymerizable precursors of the sections includes sections of hydrophilic and hydrophobic homopolymers, and each having two bifunctional end-groups.

In some embodiments, the internal phase is organic and includes an optional hydrophobic monomer, an optional hydrophobic crosslinking agent and a hydrophobic initiator agent and/or catalyst.

In some embodiments, the polymerizable precursors of the sections is a plurality of end-group-modified poloxamer.

In some embodiments, the process further includes forming the HIPE prior to the polymerization thereof.

In some embodiments, the polymerization further includes adding a polymerization initiator and/or catalyst to the HIPE.

In some embodiments, the volume fraction of the internal phase in the HIPE ranges from 0.4 to 0.95.

In some embodiments, the process further includes extracting leachable matter from the superabsorbent structure after the polymerization.

According to an aspect of some embodiments of the present invention, there is provided a process of preparing the superabsorbent structure presented herein, the process includes:

forming a high internal phase emulsion (HIPE) having an organic internal phase and an aqueous external phase;

subjecting the HIPE to polymerization of the external phase; and extracting leachable matter from the superabsorbent structure,
  wherein:
  the HIPE includes a plurality of polymerizable precursors of the sections;
  the polymerizable precursors include at least one hydrophobic homopolymer section, at least one hydrophilic homopolymer section and two bifunctional end-groups;
  the HIPE is essentially devoid of a crosslinking agent that is not the polymerizable precursors;
  the HIPE is essentially devoid of a HIPE-stabilizing agent that is not the polymerizable precursors.

In some embodiments, the polymerizable precursors of the sections is a plurality of end-group-modified poloxamer.

In some embodiments, the end-group-modified poloxamer is a $PEO_{100}$-$PPO_{65}$-$PEO_{100}$ triblock copolymer having a methacrylic moiety at each end thereof.

As used herein, the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a certain property or characteristic, refer to a process, a composition, a structure or an article that is totally devoid of the property or characteristic or characterized by less than about 5, 1, 0.5 or 0.1 percent of the property or characteristic, compared to a given standard.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

It is expected that during the life of a patent maturing from this application many polyHIPEs will be developed and the scope of the phrase polyHIPEs is intended to include all such new technologies a priori.

BRIEF DESCRIPTION OF THE SEVERAL VIEWS OF THE DRAWINGS

Some embodiments of the invention are herein described, by way of example only, with reference to the accompanying drawings or images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D present schematic diagrams of some exemplary crosslinked networks of superabsorbent structures, according to some aspects of the invention;

(FIG. 9B)

DESCRIPTION OF SPECIFIC EMBODIMENTS OF THE INVENTION

Figure 1A:
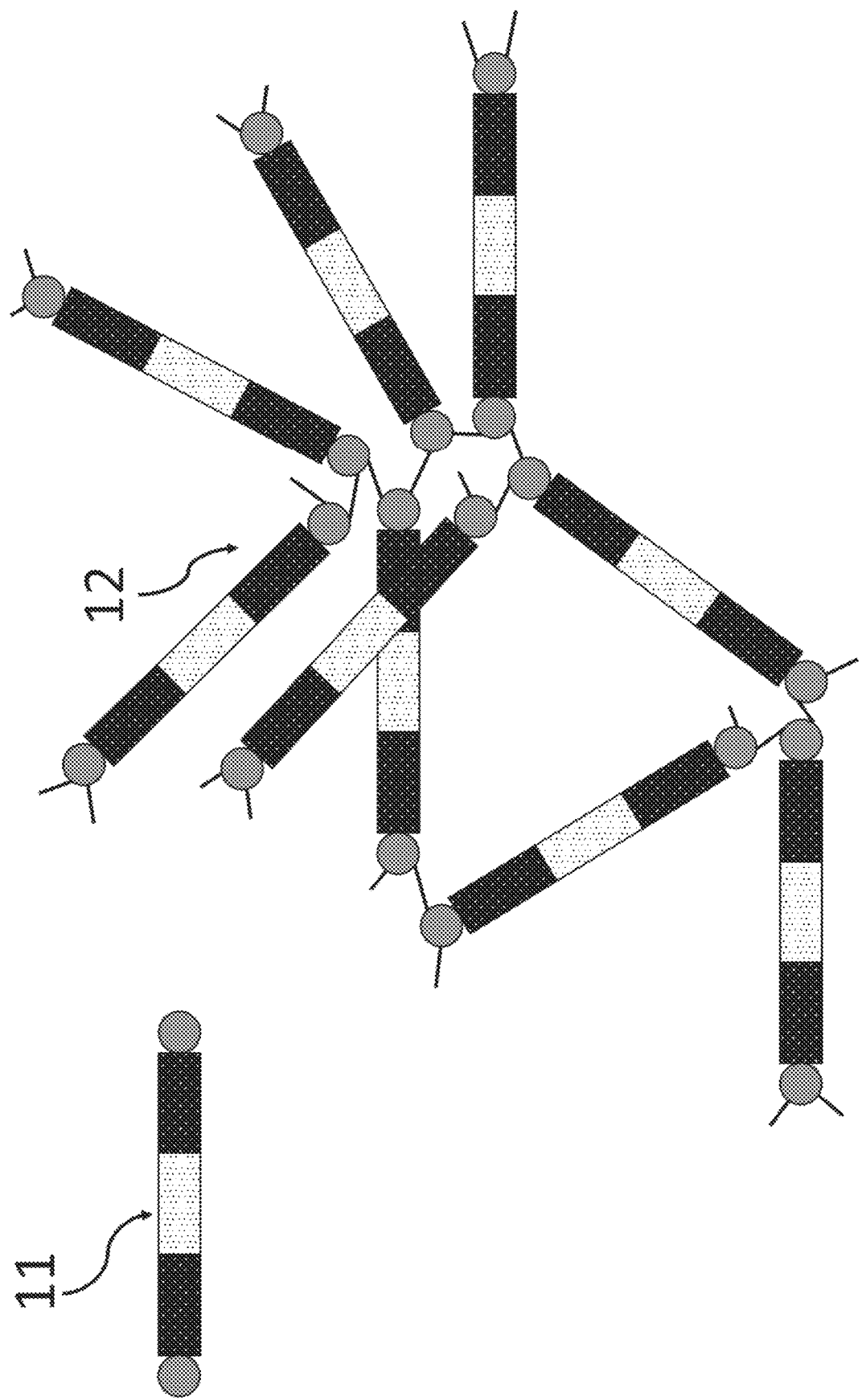

The present invention, in some embodiments thereof, relates to material science, and more particularly, but not exclusively, to polyHIPE-based structures capable of absorbing polar and non-polar liquids.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As discussed hereinabove, the liquid absorbing aptitude of hydrogel polyHIPEs has been demonstrated for aqueous media, showing unprecedented swelling capacity due to void expansion processes taking place in the unique structure combining a substance and a structure. However, no polyHIPE has been shown to absorb significant amounts of both polar and apolar liquid media. While reducing the present invention to practice, the present inventors have serendipitously found the composition and conditions that afford a structure the can swell and absorb both polar and apolar media (dual absorbency). While further studying the traits of a dual superabsorbent polyHIPE structure, as provided herein, the present inventors have identified some of the properties required in order to afford a superabsorbent structure capable of swelling in a polar medium and an apolar medium (hence "dual"), which include having a crosslinked structure, having sufficient contiguous hydrophobic and hydrophilic chains, and having a microstructure templated by the external phase of a high internal phase emulsion (HIPE).

As is widely known, block copolymers (BCPs) self-assemble in solution and in bulk to yield ordered or disordered structures in a wide range of morphologies, including spheres, cylinders, bicontinuous structures, lamellae, vesicles, and many other complex or hierarchical assemblies. This self-assembly goes through the formation of two- and three-dimensional domains of hydrophobic or hydrophilic sections and domains of the BCP. Without being bound by any particular theory, it is assumed that the dual superabsorbency exhibited by the HIPE-templated structures presented herein stems from the self-assembly of such domains prior to and/or during polymerization of the HIPE. When the HIPE is polymerized, the polymeric strands, or chains, are crosslinked sufficiently to keep the microstructure of the HIPE as well as phase-separated domains. It is assumed that the combination of the HIPE microstructure, the presence of hydrophobic and hydrophilic domains, and the elasticity afforded by crosslinking the polymeric chains into a network, confers the ability of the resulting structure to swell in both polar and apolar media. The swelling aptitude of the HIPE-templated structure presented herein is referred to as "dual superabsorbency".

Dual-Superabsorbent, HIPE-Templated Structure:

According to an aspect of the present invention, here is provided a HIPE-templated superabsorbent structure that is capable of swelling in both polar/water-miscible media as well as in apolar/water-immiscible media, which is based on a crosslinked polymer having a microstructure templated by the external phase of a high internal phase emulsion (HIPE). In order to exhibit dual superabsorbency, the crosslinked polymer is a network of crosslinked polymeric chains, wherein the polymeric chains include hydrophobic sections and hydrophilic sections; each of the hydrophobic or hydrophilic sections is a continuous (uninterrupted; consecutive) chain of at least five residues long, whereas all the residues in a section have either a hydrophobic nature or a hydrophilic nature. Herein throughout, the HIPE-templated superabsorbent structure presented herein may be referred to interchangeably as "the structure", "the superabsorbent structure", or "the HIPE-templated structure", unless indicated otherwise.

The phrase "HIPE-templated" is used herein to define the microstructure of the superabsorbent structure presented herein. By being templated by a HIPE, it is meant that the microstructure of the superabsorbent structure presented herein is a projection of the microstructure of the external continuous phase of a HIPE, substantially before and specifically after it has undergone polymerization/crosslinking. Briefly, a HIPE is a plurality of tightly packed spheroidal droplets of various sizes, constituting a liquid internal dispersed phase, separated by walls of a continuous liquid constituting the external continuous phase. The term "polyHIPE" can therefore be used as a structure-defining term to describe a highly porous monolithic structure of thin walls separating a plurality of tightly-packed voids, also referred to herein as pores or cells. The walls are typically thinner at tangential points of contact between what was tightly packed droplets before polymerization/crosslinking, and thicker at the spaces between adjacent droplets. When a HIPE is polymerized/crosslinked to yield a polyHIPE, nearly the same microstructure is substantially preserved. It is noted that the polyHIPE is templated by the HIPE's external phase to the extent of dimensional shifts, e.g., small changes in structure that occur upon removal of the main phase carries/solvents, that are not extensive and possibly the effects of gas bubbles that may be formed during the polymerization process of some particular monomers, however, for the purpose of defining the structure of the superabsorbent structure disclosed herein, the polyHIPE essentially preserves the structure of the external phase of the precursor HIPE. Hence the term "templated by", used in a phrase such as "a polymer/copolymer having a microstructure templated by an external phase of a HIPE", is a structural term rather than a process-related term, since it relates the microstructure of the HIPE to the microstructure of the resulting monolithic polymer in the superabsorbent structure.

In some embodiments, the superabsorbent structure exhibits an open-cell microstructure, namely the voids in the polyHIPE are interconnected, allowing essentially free flow of a medium in and out of the structure.

In some embodiments of the present invention, the voids in the polyHIPE, constitute at least 60% by volume of the total volume of the superabsorbent structure. In some embodiments the voids constitute at least 65%, 70%, 75%, 80%, 85%, 90% or 95% of the total volume of the superabsorbent structure.

In some embodiments, the superabsorbent structure exhibits a density of less than 0.4 g cm$^{-3}$. According to some embodiments of the invention, the superabsorbent structure exhibits a density higher than 0.14 g cm$^{-3}$. The density of the structure can be controlled by the ratio of external-to-internal phase in the precursor HIPE and the content of polymer-forming components used to form the polyHIPE presented herein.

Sections of the Superabsorbent Structure:

As used herein, the term "section" refers to a polymeric chain or a part thereof, having a succession of at least five residues long, wherein all the residues in the succession are characterized by either a more hydrophobic nature or a more hydrophilic nature. For example, in a block copolymer, each continuous block of five residues or more is a section, whereas a block is a special case of a section in which all residues are identical (homopolymer). In another example, a section is such wherein at least five consecutive residues are either hydrophilic or hydrophobic, whereas a section is a copolymer of either only more hydrophilic or only more hydrophobic residues.

In the context of embodiments of the present invention, the natures of the residues in a section, the natures of the sections, and the natures of the domains as a whole, are defined by the solvent interaction of the domain in liquid media, namely a section is referred to as a more hydrophobic section if it contributes to a domain that interacts with an apolar/water-immiscible medium, such as, e.g., toluene or dichloromethane (DCM; which may be seen as somewhat polar, but is water-immiscible and lacking the ability to form hydrogen bonds), or a more hydrophilic section if it contributes to a domain that interacts with a polar medium, such as, e.g., water or ethanol. Without being bound by any particular theory, it is assumes that the more hydrophobic sections self-assemble to form more hydrophobic domains that form a part of the crosslinked network, and the more hydrophilic sections self-assemble to form more hydrophilic domains that also form a part of the same crosslinked network; therefore, the network of the HIPE-templated superabsorbent structure presented herein can swell in both polar/water-miscible media and apolar/water-immiscible media, even simultaneously. In other words, the presence of both more hydrophobic and more hydrophilic sections/domains in the same network confers the dual superabsorbency of the structure presented herein.

Another way to define the hydrophobic sections and the hydrophilic sections is by referring to their relative hydrophobicity (or hydrophilicity) with respect to each other. As both hydrophobic sections and hydrophilic sections are required to be present in the structure provided herein, the hydrophobic sections are those that tend to form hydrophobic domains that attract and swell with medium molecules that are less water-like, or apolar, or more hydrophobic. On the other hand, in the same structure there are hydrophilic sections that tend to form hydrophilic domains that attract and swell with medium molecules that are more water-like, or polar, or more hydrophilic. In general, the defining property of a section, according to some embodiments of the present invention, can be seen as "more hydrophobic" and "more hydrophilic". Thus, the terms "hydrophobic section" and "hydrophilic section" are used herein as intra-relative (within the structure) terms, and define the differentiation between the sections as expressed by the type (nature) of the medium they attract. In mixed media (two solvents exhibiting different hydrophilic-hydrophobic natures), the more hydrophobic domains, comprising the more hydrophobic sections, would swell with the more hydrophobic (e.g., apolar) medium, while at the same time, the more hydrophilic domains, comprising the more hydrophilic sections, would swell with the more hydrophilic (e.g., polar) medium.

In the context of embodiments of the present invention, the ratio of residues of the hydrophilic sections to residues of the hydrophobic sections ranges from about 1:9 to about 9:1, or about 1:4-4:1, or about 3:7-7:3, or about 2:3-3:2, or about 1:1 (the latter means about an equal number of residues of the hydrophilic sections and residues of the hydrophobic sections).

In the context of embodiments of the present invention, the polymeric network may include, other than the residues in the hydrophilic and hydrophobic sections, other residues, such as residues that are not part of a section (commonly referred to herein as non-section residues; e.g., non-branching residues between two sections), or branching residues. Hence, in some embodiments, the total number of residues in the hydrophilic sections, and the total of residues in the hydrophobic sections, put together, is at least 30% of the total of number of residues in the network. Alternatively, the total of residues in the hydrophobic sections, and the total of residues in the hydrophobic sections, put together, is at least 40%, 50%, 60%, 70%, 80%, or 90% of the total of number of residues in the network.

The term "network", as used herein, is a structural definition that indicates that the polymeric chains in the structure presented herein are connected to one another by covalent bonds. This term includes certain embodiments in which there are more than one network, as in the case of interpenetrating polymer networks, where two different polymer networks are physically entangled, but are not covalently linked. Thus, the term "network" is not limiting to the number of discrete networks, and refers to multiple networks as "a network". Any unconnected chain(s) and/or unreacted monomer(s) are excluded from the scope of the term "network". In terms of crosslinking, the structure comprises sufficient crosslinking residues to connect all the polymeric chains in a network to provide structural integrity to the final structure, and allow the structure to swell.

In the context of embodiments of the present invention, a section is an uninterrupted continuous polymeric chain wherein all residues are either hydrophobic or hydrophilic. A section can be at least 5, 10, 20, 30, 40, 50, 60, 70, 80, 90, 100, 150, 200 or more residues long, wherein the common feature for the residues in a section is their hydrophobic/hydrophilic nature.

According to some embodiments of the invention, a section can be a homopolymer or a copolymer. A homopolymeric section is also known in the art as a block, as this term is used in the context of block copolymers.

It is noted herein that low molecular weight polyglycols are soluble in water, as some BCPs, such as Pluronic® F-127. The phase separation into domains results from polymer-polymer thermodynamics. Some monomers that are soluble in water, form homopolymers that are insoluble in water, such as poly(glycolic acid), which is insoluble in water owing to its crystallinity of about 50%.

It should be noted herein that the selection of monomers for the formation of sections should take into account that the nature of the section is the required property in terms of hydrophobicity, rather than the nature of the pre-polymerized monomer. It is further noted that some water-soluble monomers may yield water-insoluble polymers without crosslinking or crystallinity, with the solubility in water sometimes being temperature-dependent. Some polymers are soluble at low temperatures, but not at high temperatures, exhibiting a lower critical solution temperature (LCST) such as poly(isopropyl acrylamide). Others polymers are soluble at high temperatures, but not at low temperatures, exhibiting an upper critical solution temperature (UCST).

In the context of embodiments of the present invention, residues of the hydrophobic sections may be generated from monomers selected from lactic acid (lactide), styrenics, acrylates, methacrylates, dienes, caprolactone; and residues of the hydrophilic sections may be generated from monomers selected from ethylene glycol, hydroxyethyl acrylate, hydroxyethyl methacrylate, acrylamide, N-isopropyl acrylamide, acrylic acid, methacrylic acid, polysaccharides, polyphenols, N,N-dimethylacrylamide, 2-acrylamido-2-methyl-1-propanesulfonic acid, styrene sulfonate, sulfobetain methacrylate, 2-(N-3-sulfopropyl-N,N-dimethyl ammonium)ethyl methacrylate, (3-acrylamidopropyl)trimethyl-ammonium chloride, 2-(dimethylamino)ethyl acrylate, (3-methacrylamidopropyl)trimethyl-ammonium chloride, 2-(dimethylamino)ethyl methacrylate.

In some embodiments, the midblock of a BCP can be synthesized first using a variety of reactions (e.g., step-growth), yielding more complex structures than those based on free radical monomers. Reactive groups are then attached to each end and the end-blocks grown from those. Therefore, in some embodiments, it may be more suitable to refer to sections in terms of blocks rather than residues or relatively simple monomers.

The network of the crosslinked polymer may include contiguous chains of one or more hydrophilic sections and one or more hydrophobic sections, wherein the contiguous chains are separated by one or more crosslinking residues or non-section residues. In some embodiments, the contiguous chains can be a diblock copolymer, a triblock copolymer, and an alternating multiblock copolymer. In some embodiments, the triblock copolymer may include two hydrophilic sections separated by a hydrophobic section, or vice versa. In some embodiments, the contiguous chains are separated by at least one residue of a crosslinking monomer, and/or by one or more non-section residues.

According to some embodiments of the invention, the network comprises a triblock copolymer, wherein each of the sections is at least 60 residues long. According to some embodiments of the invention the ratio of residues of the hydrophilic sections to residues of the hydrophobic sections, is about 3:1. A particular, yet non-limiting example of this type of network can be afforded by crosslinking poloxamers, as this family of BCP is known in the art.

Figure 1C:
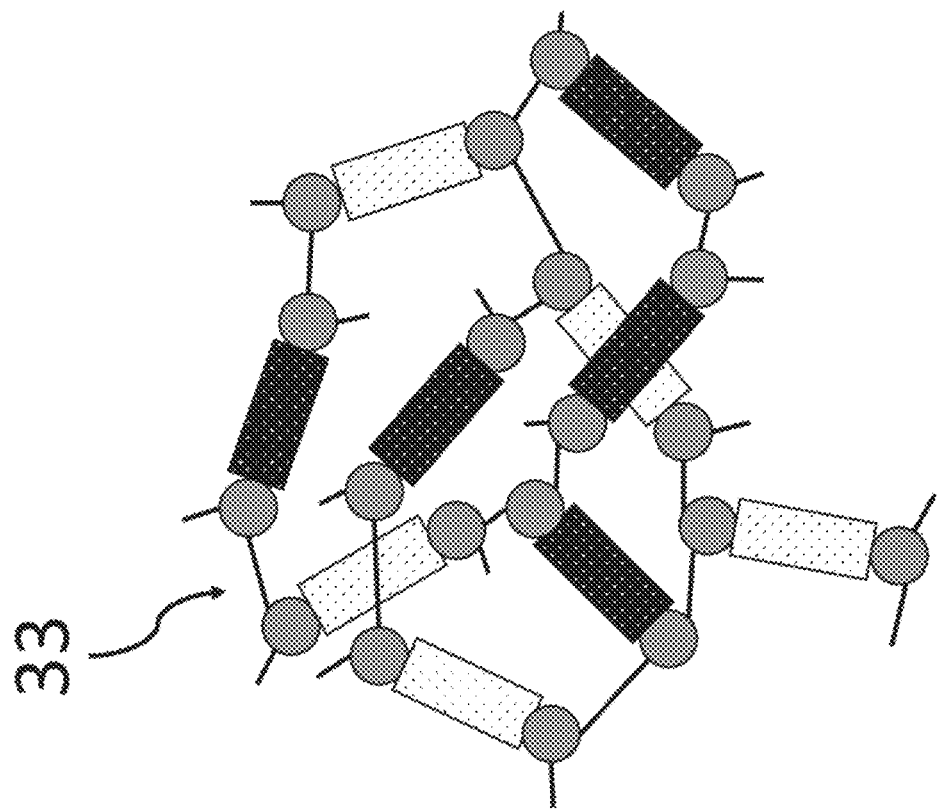
Figure 1C:
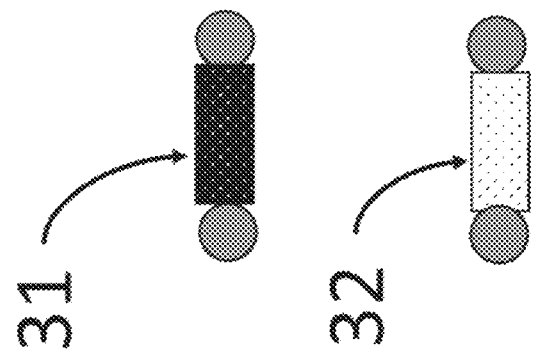

Exemplary Configurations of the Network:

FIGS. 1A-D present four schematic illustrations of exemplary and non-limiting embodiments of the present invention, showing different types of the crosslinked networks of chains comprising hydrophobic and hydrophilic sections, wherein FIG. 1A shows polymerizable species 11, consisting of a bifunctional end-capped triblock copolymer exhibiting two hydrophilic/hydrophobic sections contiguously separated by one hydrophobic/hydrophilic section, making network 12 via the bifunctional end-groups, FIG. 1B shows polymerizable species 21, consisting of a diblock copolymer exhibiting one hydrophilic section contiguously attached to one hydrophobic section, and trifunctional crosslinking agent 22, making network 23 via trifunctional crosslinking agent 22, FIG. 1C shows polymerizable species 31 and 32, each consisting of a bifunctional end-capped block copolymer exhibiting a hydrophilic and a hydrophilic section, respectively, making network 33 via the bifunctional end-groups, and FIG. 1D shows polymerizable species 41 and 42, each consisting of a block copolymer exhibiting a hydrophilic and a hydrophilic section, respectively, trifunctional crosslinking agent 43, monomer 44, making network 45 via trifunctional crosslinking agent 43.

According to some embodiments of the present invention, the crosslinked network of hydrophobic and hydrophilic sections can be built from various building blocks, as exemplified in FIGS. 1A-D. The requirements of the building blocks include the ability to polymerize with each other, the ability to form a crosslinked network, and the presence of hydrophobic and hydrophilic sections, such that the ratio of residues of the hydrophilic sections to residues of the hydrophobic sections would fall within the range of 1:9 to 9:1, that the total of number of residues of the hydrophilic and hydrophobic sections would be at least 30% of a total of number of residues in the network, and that the degree of crosslinking would allow the network to swell while maintaining its integrity, shape and microstructure.

The presence of residues of non-section monomers (see, e.g., FIG. 1D), that are neither part of the sections nor crosslinking residues, is an optional feature that allows fine-tuning various specific mechanical and chemical attributes of the resulting superabsorbent structure. Such monomers may be hydrophobic, hydrophilic or amphiphilic, yet they are not considered as part of the section they are adjacent to if their character is different from the character of the other residues in the section. In some embodiments, such monomers can add flexibility to the structure; thereby affect the swelling aptitude thereof.

Process of Manufacturing:

According to some aspects of the invention provided herein a process of preparing the superabsorbent structure is disclosed herein. The process is effected by subjecting a high internal phase emulsion (HIPE), having an internal phase and a polymerizable external phase, to polymerization of the external aqueous phase.

Once the HIPE is prepared, the polymerization reaction is initiated in a manner appropriate for the specific polymerization reaction/reagents and the polymerization initiating agent (initiator) and/or catalyzing agent. In some embodiments, the initiator and/or catalyst is added to one of the HIPE phases, and when the HIPE is ready, an external stimulus, such as heat, irradiation and the likes, is activated. In some embodiments, the initiator and/or catalyst is added to the ready HIPE just before mixing is halted to allow the structure to form.

In some embodiments, the process further includes an extraction and purification step, in which the resulting polyHIPE is washed clean of leachables, solvents, reagents, and unreacted substances. The process disclosed herein can further include substantially removing the internal organic phase from the superabsorbent structure in the extraction and purification step, which may involve more than one solvent exchange stage. Thus, removing the internal phase from the superabsorbent structure may include solvent exchange.

The process disclosed herein can further include, subsequent to solvent exchange, drying the composition-of-matter from solvents.

As discussed hereinabove, once the polymerization reaction is substantially complete, and the polyHIPE is formed, the internal phase is removed from the polyHIPE by means of vacuum, extraction, heating or freeze drying. In some embodiments, the internal phase is removed in several steps that include exchanging a water-immiscible organic solvent or melt with a water-miscible organic solvent. Exchanging the water-immiscible solvent can be effected by Soxhlet extraction or immersion in the water-miscible organic solvent. In some embodiments, the solvent exchange is effected at a relative low temperature, e.g., at a temperature lower than 0° C. It is noted herein that water miscibility may have a smaller effect than the surface tension and vapor pressure of the solvent. For example, ether may be used so that it will evaporate easily without generating capillary stress and causing the collapse of the structure.

Exemplary solvents that can be used to replace the internal phase include, without limitation, an alcohol such as methanol, ethanol, propanol and isopropanol, as well as acetone, acetonitrile, N,N-dimethylformamide (DMF) and dimethylsulfoxide (DMSO).

Once the internal phase has been replaced, removal of the water-miscible organic solvent is effected extraction and/or washes, and the remaining solvent is removed by heat, vacuum, freeze-drying and/or ambient drying.

Generally, the polymerizable mixture that forms the network, which includes a plurality of polymerizable precursors of the sections, is in the polymerizable external phase, although some elements of the network may be found in in the internal phase, or partially in the internal phase, depending on their solubility in polar and apolar solvents. In some embodiments, the HIPE is an O/W emulsion, wherein the internal phase is organic (i.e., comprising a water-immiscible solvent) and the external polymerizable is an aqueous solution that includes at least some of the ingredients that form the sections, as disclosed herein.

The polymeric network of the structure presented herein is afforded by polymerizing/crosslinking one or more types of polymerizable precursors of the sections, which include short (5-5000-mer long) homopolymers or copolymers (jointly referred to herein as "polymerizable oligomers" or "precursors") that can be polymerized and be tethered to each other upon subjecting thereof to a polymerization/crosslinking reaction, to thereby form the crosslinked network. The capacity of the oligomers to polymerize and/or crosslink typically stems from having a polymerizable functional group (also referred to as functionalities or moieties) at each end thereof, such as an acrylic (double bond) functionality, a hydroxyl (—OH) group, and amine (—NH$_3$) functionality, an ester (—COO—R) functionality, a carboxylic (—COOH) functionality, an azido (—N$_3$) functionality, hydrazine (—NH—NH$_2$) functionality, nitrile (—CN) functionality, and many other types of polymerizable functionalities, as these are known in the art.

According to some embodiments, polymerizable oligomers include polymerizable hydrophilic/hydrophobic block copolymers (the BCPs are regarded as polymerizable entities), polymerizable hydrophobic/hydrophilic copolymers (hydrophilic or hydrophobic copolymers that are regarded as polymerizable entities), at least two species (hydrophobic and hydrophilic) of polymerizable homopolymers, and at least two species (hydrophobic and hydrophilic) of polymerizable copolymers. The polymerizable mixture being subjected to polymerization/crosslinking may also include optional non-section monomers and/or optional crosslinking monomers.

As illustrated schematically in FIG. 1A, polymerizable species 11 is an exemplary triblock copolymer exhibiting two hydrophilic/hydrophobic sections contiguously separated by one hydrophobic/hydrophilic section end-capped with bifunctional reactive groups. As can be seen in FIG. 1B polymerizable species 21 is an exemplary diblock copolymer, exhibiting one hydrophilic section contiguously attached to one hydrophobic section, and an exemplary trifunctional crosslinking agent 22 is added to form a crosslinked network. As can be seen in FIG. 1C, polymerizable species 31 and 32 are exemplary polymers one hydrophilic and the other hydrophilic, with each end-capped by bifunctional reactive groups. As can be seen in FIG. 1D, polymerizable species 41 and 42, are each an exemplary polymer, one hydrophilic and the other hydrophilic, which form a network wen reacted with trifunctional crosslinking agent 43, whereas monomer 44 is an exemplary monomer that can be added for fine-tuning of various property of the resulting structure.

In some embodiments of the present invention, the polymerizable functionality of the precursors may have the capacity to form more than one bond, and therefore, such functionality, that can be present at one or both ends of the polymerizable oligomer, may act as a crosslinking moiety by forming a crosslinking point along the polymeric chain. For example, in some embodiments, the polymerizable hydrophilic/hydrophobic block-copolymers and the polymerizable hydrophobic/hydrophilic polymers may exhibit a bifunctional or multifunctional moiety at each end thereof, thereby constituting a type of polymerizable oligomers that act also as crosslinking agents. Exemplary polymerizable and crosslinking block copolymers include, without limitation, PEO-PPO-PEO dimethacrylate and [PEO-PPO]4-ethylenediamine tetramethacrylate. In the Examples that follows below, the poloxamer compound F-127-DMA (a PEO-PPO-PEO block copolymer having a methacrylic group on each end) was used to manufacture an exemplary HIPE-templated dual superabsorbent structure, according to some embodiments of the present invention. This polymerizable poloxamer is an example of a polymerizable precursor of sections that acts as a source of hydrophilic and hydrophobic sections and as a crosslinking agent, as well as a HIPE-stabilizing agent.

Additional guidance for obtaining crosslinkable/polymerizable precursors of sections, according to some embodiments of the present invention, can be found, for example, in Vandenhaute, M. et al., *European Polymer Journal*, 2014, 53, pp. 126-138.

In embodiments wherein the polymerizable precursors do not exhibit a crosslinking moiety, the mixture may include crosslinking monomers. Such monomers are characterized by exhibiting functionalities that can form at least three bonds. For example, an acrylic functionality (a reactive double bond) can form two bonds, and when a molecule exhibits two such functionalities, it is regarded as a crosslinking monomer.

As used herein, the phrases "crosslinking monomer", "crosslinking agent", or "crosslinking comonomer", refer herein to a substance that promotes or regulates intermolecular covalent, ionic, hydrogen, coordinative, hydrophobic or other form of bonding between polymer chains, linking them together to create a network of chains which result in a more cohesive structure. Crosslinking agents, monomers or oligomers, having a plurality of polymerizable moieties attached thereon, according to some embodiments of the present invention, contain a functionality greater than two, for example, two double bonds (acryls, methacryls, vinyls) (a functionality of four) or three amines (a functionality of three), creating chemical bonds between two or more polymer molecules (chains).

Crosslinking agents include, without limitation, crosslinking comonomers (molecules that participate in the polymerization process and contribute reactive functional groups to the main-chain), nanoparticles modified to present a plurality of reactive functional groups thereon, such as reactive silanes, and reactive polyhedral oligomeric silisesquioxanes (POSS), multi-functional oligomers, and metal coordination agents. The type of crosslinking agent is selected according to its compatibility with the other polymerizable units, the HIPE-forming conditions, and the conditions of the HIPE polymerization reaction. The crosslinking agent is also selected according to its solubility, wherein a crosslinking agent that can dissolve in the pre-polymerizable mixture together with the monomers will be a natural choice, while crosslinking agents that can dissolve in the other phase but can cross the phase boundary during the polymerization process are also contemplated. For example, ethylene glycol dimethacrylate (EGDMA) is hydrophobic and can dissolve more readily in the internal organic phase, and it is contemplated as a crosslinking agent since it has been shown to take part in a polymerization reaction within an emulsion's aqueous phase.

Most polyHIPEs are crosslinked using crosslinking comonomers such as divinylbenzene (DVB) for W/O-based polyHIPEs and N,N'-methylenebisacrylamide (MBAAm) for O/W-based polyHIPEs. A crosslinking comonomer, in the abovementioned example of radical polymerization, is a molecule with at least two polymerizable double bonds. The most common crosslinking comonomers contain two polymerizable double bonds. However, it is also possible to crosslink polyHIPEs using comonomers or oligomers containing multiple polymerizable double bonds, or other reactive functional groups in other polymerization mechanisms, such as carboxyls, ethers, cyanates, amines, amides, sulfones, sulfates, thiols, hydroxyls and the likes.

Exemplary bifunctional acrylic crosslinking monomers that can be used in the context of some embodiments of the present invention as crosslinking monomers, include, without limitation, polyethylene glycol dimethacrylate (PEGDMA), 1,6-hexanedol diacrylate, 1,6-hexanecol dimethacrylate, 1,9-nonanediol dimethacrylate, 1,4-butanediol dimethacrylate, 1,3-butanediol dimethacrylate, 1,10-decanediol dimethacrylate, diurethane dimethacrylate (DUDMA), 1,4-butanediol diacrylate, ethylene glycol diacrylate (EGDA), 1,5-pentanediol cimethacrylate, 1,4-phenylene diacrylate, allyl methacrylate, 2,2-bis[4-(2-hydroxy-3-methacryloxypropoxy)phenyl]propane, tricyclod6cane dimethanol diacrylate, tetraethylere glycol diacrylate (TetEGDA), polyethylene glycol diacrylate (PEGDA), bis(2-methacry; oxyethyl) phosphate, ethylene glycol dimethacrylate (EGDMA), diethylene glycol diacrylate (DEGDA), diethylene glycol dimethacrylate (DEGDMA), triethylene glycol diacrylate (TnEGDA), triethylere glycol dimethacrylate, tetraethylene glycol dimethacrylate, poly(ethylene glycol) diglycidyl ether (PEGDGE), polyethylene glycol diacrylate (PEGDA), triethylere glycol dimethacrylate, and N,N-diallylacrylamide.

Exemplary multifunctional acrylic crosslinking monomers that can be used in the context of some embodiments of the present invention as crosslinking monomers, include, without limitation, dipentaerythritol pentaacrylate, 1,1,1-Trimethylolpropane triacrylate (TriMPTA), 1,1,1-Trimethylolpropane trimethacrylate, pentaerythritol triacrylate and pentaerythritol tetraacrylate.

Non-section monomers, which are also not crosslinking monomers, can be used to alter and fine-tune the resulting structure, as presented herein, by attachment to the network. In the context of embodiments of the present invention, non-section monomers can be any monomer known in the art that is suitable for a polymerization reaction with the polymerizable precursors.

Exemplary acrylic monomers that can be used as non-section monomers in the context of some embodiments of the present invention as crosslinking monomers, include, without limitation, acrylic acid, alkyl-acrylate, alkyl-methacrylate, N-alkyl-N-vinyl acetamide, and any monomer that is suitable for polymerizing with the polymerizable sections precursors.

In some embodiments, the HIPE is essentially devoid of a crosslinking agent that is not a part of the plurality of polymerizable precursors of sections, as the network is crosslinked via the di- or multifunctional functionalities at each end of the polymerizable section precursors. Such an example is the HIPE used to form the HIPE-templated dual superabsorbent structure in the Examples that follow below.

In the context of embodiments of the present invention, the volume fraction of the internal phase in the HIPE ranges from 0.4 to 0.95. Thus, HIPEs are inherently unstable and have a tendency to undergo phase inversion or phase coalescence. The structure of HIPE can be maintained during the polymerization reaction under certain conditions, preferably using emulsion stabilizers, or HIPE-stabilizing agents. The HIPE structure gives rise to a number of properties including high viscosities. It is possible to prepare metastable HIPEs, which show no change in properties or appearance over long periods of time, or at least through a polymerization process of the external continuous phase.

Only a few of the available emulsion stabilizers (emulsifiers) are able to keep the major internal phase dispersed within the minor external phase. Some HIPE-stabilizing agents are insoluble in the internal phase and their molecular packing is capable of promoting the formation of a convex interface between the external and internal phases. As discussed hereinabove, one of the challenges in forming a polyHIPE is stabilizing the HIPE though the polymerization reaction. In the context of embodiments of the present invention, suitable HIPE-stabilizing agents include surface-active substances (surfactants) and/or certain types of polymers and block copolymers (reactive and/or non-reactive; a polypeptide; a protein; an oligosaccharide; a polysaccharide), and/or solid surface-modified or unmodified particles/nanoparticles (NP). In some embodiments, the effect of the abovementioned HIPE-stabilizing agents is further enhanced by salts.

According to some embodiments of the present invention, the emulsion stabilizer is a surfactant, which is present in the external phase of the HIPE. Alternatively, in some embodiments, the surfactant is present in the internal and/or the external phase of the HIPE. The surfactant is characterized, inter alia, by its hydrophilic-lipophilic balance (HLB). HLB values can be used to roughly predict the surfactant properties of a molecule, wherein HLB<10 is exhibited by a lipid-soluble (water-insoluble) surfactant, HLB>10 by water-soluble (lipid-insoluble) surfactant, 1 to 3 is an HLB of an anti-foaming agent, 3 to 8 is an HLB of a W/O (water in oil) emulsifier, 7 to 9 is an HLB of a wetting and spreading agent, 13 to 16 is an HLB of a detergent, 8 to 16 is an HLB of an O/W (oil in water) emulsifier, and 16 to 18 is an HLB of a solubilizer or hydrotrope. A non-polymerizing surfactant that may be used for stabilizing the HIPE en route to forming the structure provided herein, may be characterized, according to some embodiments of the present invention, by an HLB that ranges from 8 to 16.

Exemplary hydrophobic non-ionic surfactants include, without limitation, poloxamers, members of the alkylphenol hydroxypolyethylene family and a polyethoxylated sorbitan esters (polysorbitans). Other types of surfactants, such as anionic and cationic surfactants are also contemplated within the scope of the present invention. According to some embodiments of the present invention, the surfactant is nonionic surfactant.

In some embodiments, the surfactant is suitable for stabilizing oil-in-water HIPEs, such as members of the Tween family of surfactants, the Triton family of surfactants, sodium lauryl sulfate (SLS), sodium dodecyl sulfate (SDS), and, in addition block copolymers such as PEO-PPO-PEO and the likes.

In some embodiments, the surfactant is a poloxamer such as the commercially available Pluronic® type surfactants, all of which are block copolymers based on poly(ethylene oxide) (PEO) and poly(propylene oxide) (PPO). Pluronic poloxamers can function as antifoaming agents, wetting agents, dispersants, thickeners, and emulsifiers.

In some embodiments, the surfactant is an oil-soluble poloxamer of the commercially available Synperonic™ PE family of surfactants, constituting non-ionic, tri-block copolymer surfactants suitable for industrial and pharmaceutical applications. These poloxamers are chemically very similar, differing only in their poly(propylene oxide) to poly(ethylene oxide) content. This variation causes the physical and surface active properties of the poloxamers to vary.

In some embodiments, the surfactant is an oil-soluble member of the commercially available Kolliphor™ type surfactant.

In some embodiments of the present invention, the HIPE can be stabilized by a plurality of particles, or nanoparticles, forming a Pickering emulsion, as this term is known in the art. In the context of embodiments of the present invention, the nanoparticles are inorganic and/or organic nanoparticles, which are suspendable in liquid media and can stabilize a HIPE, namely capable of forming Pickering HIPE compositions. As noted hereinabove, HIPEs can be stabilized with nanometer-sized particles to millimeter-sized particles; hence, the description of surface modification of the particles applies to particles of all sizes.

In some embodiments, the surfactant is suitable for stabilizing water-in-oil HIPEs, such as members of the Span family of surfactants (such as sorbitan monooleate (SMO), sorbitan monolaurate (SML)), polyglycerol polyricinoleate (PGPR), and the Hypermer family of surfactants. In some embodiments, the surfactant is selected from the group consisting of sorbitan monooleate, polyglycerol polyricinoleate, a hydrophobic-hydrophilic block copolymer, and any combination thereof. In some embodiments, the surfactant is Poloxamer 407, Triton X-405, Triton X-100, Triton X-705 and Tween 20.

The concentration of the HIPE-stabilizing surfactant ranges, according to some embodiments of the present invention, from 0.01% to 30% by weight of the total weight of the external phase of the precursor HIPE. Alternatively, concentration of the HIPE-stabilizing surfactant ranges from 20% to 30% of the total weight of the external phase is usual for surfactants. It is noted herein that in case of Pickering emulsion stabilization, a very small amount of HIPE-stabilizing nanoparticles is sufficient to stabilize certain HIPEs, as low as 0.01 wt. % of total weight of the external phase.

Additional information regarding emulsion stabilizing solid particles can be found in the art [Silverstein, M. S., *Polymer*, 2014, 55, pp. 304-320; and Silverstein, M. S. and Cameron, N. R., *PolyHIPEs—Porous Polymers from High Internal Phase Emulsions*, Encyclopedia of Polymer Science and Technology, 2010].

In some embodiments, the surfactant/surface stabilizing agent is able to polymerize and form the network. According to some embodiments of the present invention, the HIPE is essentially devoid of a HIPE-stabilizing agent that is not a polymerizable precursor of sections. In such embodiments, the polymerizable precursor may be an end-group-modified poloxamer that serves three critical and different roles: provides sections for the network, crosslinks the polymeric chain into a network, and stabilizes the HIPE en route to forming the HIPE-templated dual superabsorbent structure provided herein.

In the Examples that follows it is demonstrated that the poloxamer Pluronic® F-127, a $PEO_{100}$-$PPO_{65}$-$PEO_{100}$ tri-block copolymer with poly(ethylene oxide) (PEO) and poly (propylene oxide) (PPO) blocks, was modified to exhibit a bifunctional methacrylic (DMA) moiety (a polymerizable functionality) at each end thereof, and therefore, could act as a crosslinking entity. This "F-127-DMA" was used successful to stabilize the exemplary HIPE. This triple-utility polymerizable precursor nullified the need for an additional crosslinking agent and an additional HIPE-stabilizing agent, and in fact, the resulting exemplary structure consists of F-127-DMA residues.

A Swollen Structure:

According to an aspect of some embodiments of the present invention, there is provided a swollen structure, which includes the HIPE-templated dual superabsorbent structure disclosed herein, wherein a polar medium and/or apolar medium are absorbed therein.

In the context of embodiments of the present invention, the term "apolar medium" refers to a family of organic liquids that are regarded as hydrophobic to some extent, water-immiscible to some extent or having a relatively high octanol/water partition coefficient (Log Pow), as these media are known in the art. Exemplary apolar media include, without limitation, toluene, pentane, hexane, benzene and DCM. The term "polar medium" refers to water, aqueous media, and a family of organic liquids that are regarded as hydrophilic to some extent, water-miscible to some extent or having a relatively low Log Pow, as these media are known in the art. Exemplary polar media include, without limitation, water, acetone, N,N-dimethylformamaide (DMF), ethanol, and methanol.

According to some embodiments of the invention, the swollen structure may have an equilibrium volumetric uptake of, for example, at least 20 mL of water to one gram of superabsorbent structure. For example, the swollen structure may exhibit at least 15 mL of ethanol to one gram of the superabsorbent structure, and at least 40 mL toluene to one gram of the superabsorbent structure. According to some embodiments of the invention, the swollen structure is characterized by an equilibrium volumetric uptake of at least 70 mL of DCM to one gram of the superabsorbent structure.

In general, for a polyHIPE density of 0.10 g/cc, an uptake of 10 mL/g would involve swelling of the polyHIPE; for a polyHIPE density of 0.14 g/cc, an uptake of 7 mL/g would involve swelling of the polyHIPE; for a PH density of 0.20 g/cc, an uptake of 5 mL/g would involve swelling of the polyHIPE. Therefore, 20 mL/g, as demonstrated in the Examples below, should not be seen as a minimum uptake. The uptakes are listed in mL/g and not g/g to remove the influence of solvent density.

According to some embodiments of the invention, the swollen structure is characterized by a water uptake at 50° C. of less than 40% of the water uptake of the swollen structure at 5° C. It is noted herein that the variation of uptake with temperature is not necessarily correlated to the dual uptake of both hydrophilic liquids and hydrophobic liquids.

According to some embodiments of the invention the superabsorbent structure of includes a continuous polymeric porous matrix composed of a network of backbone chains, wherein the matrix is composed of hydrophilic and hydrophobic domains on the order of tens of nanometers, which is the order of magnitude associated with the phase separation in block copolymers.

An Article of Manufacturing:

According to some aspects of the invention, there is provided an article of manufacturing that includes the superabsorbent structure disclosed herein. The article of manufacturing can be any one of the following, without limitation: a basic solution retention device, an acidic solution retention device, a cosmetic product, a diaper, a filter material, matrix or device, a flood/spill control material or device, a grooming product, a liquid waste material or device, a personal care and/or hygiene product, a surgical pad, a water purification material, matrix or device, a water retention material or containing device, a wound dressing, an incontinence garment, and an ion-exchange material, matrix or device.

Due to their unique liquid nature, HIPEs can be cast into any shape and size mold prior to polymerization/crosslinking, or they can be reshaped and further processed following casting and polymerization. The HIPE-templated superabsorbent structure provided herein can therefore take any size of a particle, a block, a sphere, a bead, a rod, a particle (powder), a flat or shaped sheet, a tube or a fiber.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Superabsorbent PolyHIPE Synthesis

The following is a reduction to practice of the challenge of forming of mechanically robust emulsion-templated superabsorbent structures embodying aspects of the present invention. Additionally, the examples below demonstrate polyHIPE superabsorbent structures embodying aspects of the present invention produced from reactive BCPs, that in contrast to attempts that were made until today, demonstrated robustness. Previous attempts made until today to produce polyHIPE-based structures from BCs afforded fragile and unstable structures.

The study below presents a series of exemplary polyHIPE-based superabsorbent structures prepared within an O/W HIPEs stabilized with a reactive crosslinking triblock copolymer formed from the commercially available Pluronic® F-127 surfactant.

Materials:

Pluronic® F-127 (also referred to herein as "F-127"); triethylamine (TEA); methacryloyl chloride; NaHCO$_3$; N,N,N',N'-tetramethylethylenediamine (TEMED); ammonium persulfate (APS); deionized water; analytical grade ethanol; diethyl ether; cyclohexane; toluene; and DCM, were all commercially available from common providers.

Synthesis of F-127-DMA:

Pluronic® F-127, which is commonly used to stabilize HIPEs, exhibits two hydrophilic sections contiguously separated by one hydrophobic section. In this example, Pluronic® F-127 has been chemically modified to further exhibit a bifunctional methacrylic moiety at each end thereof, such that the afforded molecule, referred to herein as "F-127-DMA", is a polymerizable crosslinking BC.

F-127-DMA, presented in Scheme 1 below, was synthesized from F-127 by an end-capping reaction with methacryloyl chloride in DCM, according to a method reported previously [Sun, Y.-n. et al., *ACS Macro Lett.*, 2014, 3, pp. 496-500].

Scheme 1

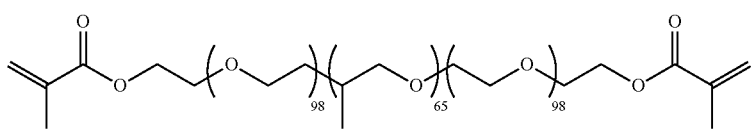

Briefly, F-127 (25.2 g, 2 mmol) and triethylamine (2.0 mL, 12 mmol) were dissolved in DCM (200 mL) and cooled to 0° C. in an ice water bath. Methacryloyl chloride (1.4 mL, 12 mmol) in DCM (50 mL) was added dropwise to the F-127 solution under stirring. Stirring was continued for 12 hours at room temperature after adding the methacryloyl chloride. The reaction mixture was subsequently washed with water (75 mL), an $NaHCO_3$ aqueous solution (5%, 50 mL) and water (75 mL). After drying with anhydrous $Na2SO_4$, the DCM solution was concentrated to 75 mL by evaporation and then precipitated into an excess of diethyl ether to obtain F-127-DMA. Finally, the resulting F-127-DMA was dried under vacuum at room temperature.

The chemical structure of reactive triblock copolymer, F-127-DMA, was verified by $^1H$ NMR (results not shown), and contained over 91% methacrylation.

F-127-DMA was soluble in water, ethanol, toluene and dichloromethane, yielding transparent solutions, demonstrating that the methacrylation did not produce a significant change in the solubility.

Concentrations of F-127-DMA in water that were higher than 15 wt. % led to gel formation during the initial stage of cyclohexane addition used for HIPE formation, as the swollen micelles formed an entangled F-127-DMA network.

Synthesis of F-127-DMA-Based polyHIPEs:

In this embodiment of the present invention, the superabsorbent structure is based on a polyHIPE manufactured essentially from one building block, F-127-DMA, which simultaneously fills the roles of the HIPE stabilizer (same as the precursor Pluronic® F-127 surfactant), the source of hydrophobic and hydrophilic sections (PEO-PPO-PEO block copolymer) and the crosslinking agent (a methacrylic end-group on each end).

PolyHIPE-templated superabsorbent structures were denoted PF-X, where X represents the volume fraction of the internal phase. The typical procedure for the preparation of the PF-X from 50 mL of the corresponding HIPE is described below.

Cyclohexane was added dropwise as the internal organic phase into an aqueous solution of APS and F-127-DMA, which constituted the polymerizable external aqueous phase. The addition of cyclohexane was carried under constant stirring with an overhead stirrer at 400 rpm. To enhance HIPE emulsion homogeneity, the stirring was continued for another two minutes after the addition of all the cyclohexane until completing the formation of the HIPE. The stirring speed was then reduced to 80 rpm, TEMED (catalyst) was added, and the stirring was continued for an additional three minutes. Thereafter the polymerization was allowed to complete. The exemplary HIPE recipes are listed in Table 1.

The reactive triblock copolymer F-127-DMA was able to successfully stabilize cyclohexane-in-water HIPEs containing 75 to 85 vol. % cyclohexane. These HIPEs exhibited relatively high stability, with no phase separation observed over two weeks. The maximum F-127-DMA content that was soluble in the HIPE's aqueous phase was about 15 wt. %.

The PF-X (F-127-DMA being the only polymerizable species) were synthesized and exhibited gel fractions of around 91 wt. %, indicating that the polyHIPEs were highly crosslinked, as expected from a polymerized dimethacrylate.

TABLE 1

| | PF-75 | PF-80 | PF-85 |
|---|---|---|---|
| External, aqueous phase, vol. % | | | |
| F-127-DMA | 3.75 | 3.00 | 2.25 |
| $H_2O$ | 21.25 | 17.00 | 12.75 |
| APS | 0.04 | 0.03 | 0.03 |
| Total | 25.04 | 20.03 | 15.03 |
| Internal, organic phase, vol. % | | | |
| Cyclohexane | 74.89 | 79.91 | 84.91 |
| TEMED (catalyst added after HIPE formation), vol. % | | | |
| | 0.07 | 0.06 | 0.06 |

In some work, water or an aqueous solution has been placed above W/O HIPEs to limit the direct contact with air during polymerization. However, for these O/W HIPEs, where aqueous solutions cannot be used, a second o/w HIPE (substituting F-127-DMA with non-polymerizable F-127) was carefully placed over the PF-X HIPE. The polymerization was carried out in a convection oven at 40° C. for 16 hours. Following polymerization, the HIPE above the PF-X was removed and the resulting polyHIPE structures were frozen (by placing in a freezer at −25° C. for 3 hours), cut into cubes (about 1 cm×1 cm×1 cm), and washed from unreacted substances and the internal phase using Soxhlet extraction, first with ethanol and then with diethyl ether, each for 24 hours. Following the extraction, the polyHIPEs were placed into a beaker, frozen at −25° C. for 3 hours, and then the diethyl ether was removed by placing in a vacuum oven at room temperature for 24 hours (the beaker was wrapped with an insulating paper towel to reduce the rate of heat transfer).

Synthesis of a Reference Polymer:

A reference polymer, referred to herein as R-15, was prepared by polymerizing an aqueous solution containing 15 wt. % F-127-DMA and 0.15 wt. % APS (identical to the aqueous phase contents of the HIPEs) in a convection oven at 40° C. for 16 hours. The resulting reference hydrogel was immersed in water (the hydrogel:water ratio was 1:50) for 4 days, changing the water every day. R-15 was then dried in a vacuum oven at room temperature for 24 hours to obtain a monolith with a density of 0.80 g $cm^{-3}$.

Gel Fraction, Density, and Microstructure Characterization:

The gel fractions of the PF-X samples presented hereinabove, based on the F-127-DMA content in the HIPE, were determined using a mass balance following Soxhlet extraction, and the densities were determined gravimetrically.

The microstructure of the PF-X samples was visualized using scanning electron microscopy (SEM) at 10 kV (FEI Quanta 200). Cryogenic fracture surfaces, obtained by immersing the PF-X samples in liquid nitrogen before fracture, were coated with a thin gold-palladium layer. The average void diameters and the average interconnecting hole diameters were determined by measuring at least 100 of each. The average of 100 void diameters was multiplied by $2/(3^{1/2})$ to correct for the statistical nature of the section.

Small angle X-ray scattering (SAXS) and wide-angle X-ray scattering (WAXS) were performed under vacuum using a SAXS/WAXS system (Molecular Metrology Instrument).

Calorimetric measurements were carried out on a Mettler DSC-821e differential scanning calorimeter (DSC) in nitrogen. About 10 mg of F-127, F-127-DMA or the PF-X were put in a DSC pan. The samples were quenched to −75° C. and subsequently heated to 100° C. to detect the melting temperature of the as-synthesized polymers (first heating). After a 5 minutes isotherm at 100° C., the samples were cooled to −75° C. (first cooling). The heating scan and cooling scan were carried out at 10° C. min$^{-1}$. The melting temperatures and the crystallization temperatures were determined from the maximum of the endothermic peak and the minimum of the exothermic peak, respectively.

The PEO block crystallinities ($X_c$, wt. %) within F-127, F-127-DMA and PF-X were determined from the peak areas by dividing by the $\Delta H_m$ for perfectly crystalline PEO (205 Jg$^{-1}$). According to their chemical structures, the PEO fraction within F-127 is 70 wt. %, while the PEO fraction within F-127-DMA is 69 wt. %.

Liquid Uptake:

The ambient temperature equilibrium liquid uptakes in the PF-X and in R-15 were determined gravimetrically. Typically, a sample cube (about 0.5 cm×0.5 cm×0.5 cm) with a known dry mass ($W_d$) was placed in a vial containing a liquid (deionized water, ethanol, toluene, or DCM) until fully swollen (up to 24 hours) and then the mass of the swollen sample ($W_{sw}$) was determined. The equilibrium mass uptake ($U_{m\infty}$), calculated using Equation 1, was an average of at least three cubes. The room temperature mass uptake as a function of time ($U_m(t)$) was normalized by $U_{m\infty}$ to yield the normalized mass uptake $N_m(t)$ using Equation 2.

$$U_{m\infty}=(W_{sw}-W_d)/W_d \quad \text{(Equation 1)}$$

$$N_m(t)=U_m(t)/U_{m\infty} \quad \text{(Equation 2)}$$

The equilibrium volumetric uptakes ($U_{v\infty}$, in mL g$^{-1}$) which can be used to compare the absorption of liquids with different densities were calculated using Equation 3 and based on the known density of the swelling liquid ($\rho_l$) (1.00 g cm$^{-3}$ for water, 0.816 g cm$^{-3}$ for ethanol, 0.866 g cm$^{-3}$ for toluene, and 1.235 g cm$^{-3}$ for DCM).

$$U_{v\infty}=U_{m\infty}/\rho_l \quad \text{(Equation 3)}$$

Water Uptakes at Various Temperatures:

The water uptakes of the PF-X and R-15 were also determined as a function of temperature, from 5 to 50° C. in 5° C. increments, using a method similar to that described above. The water temperature was controlled using a Thermo Neslab RTE-110 water bath (Neslab Instruments, USA) and verified using a thermometer.

Example 2

Characterization

Figure 2:
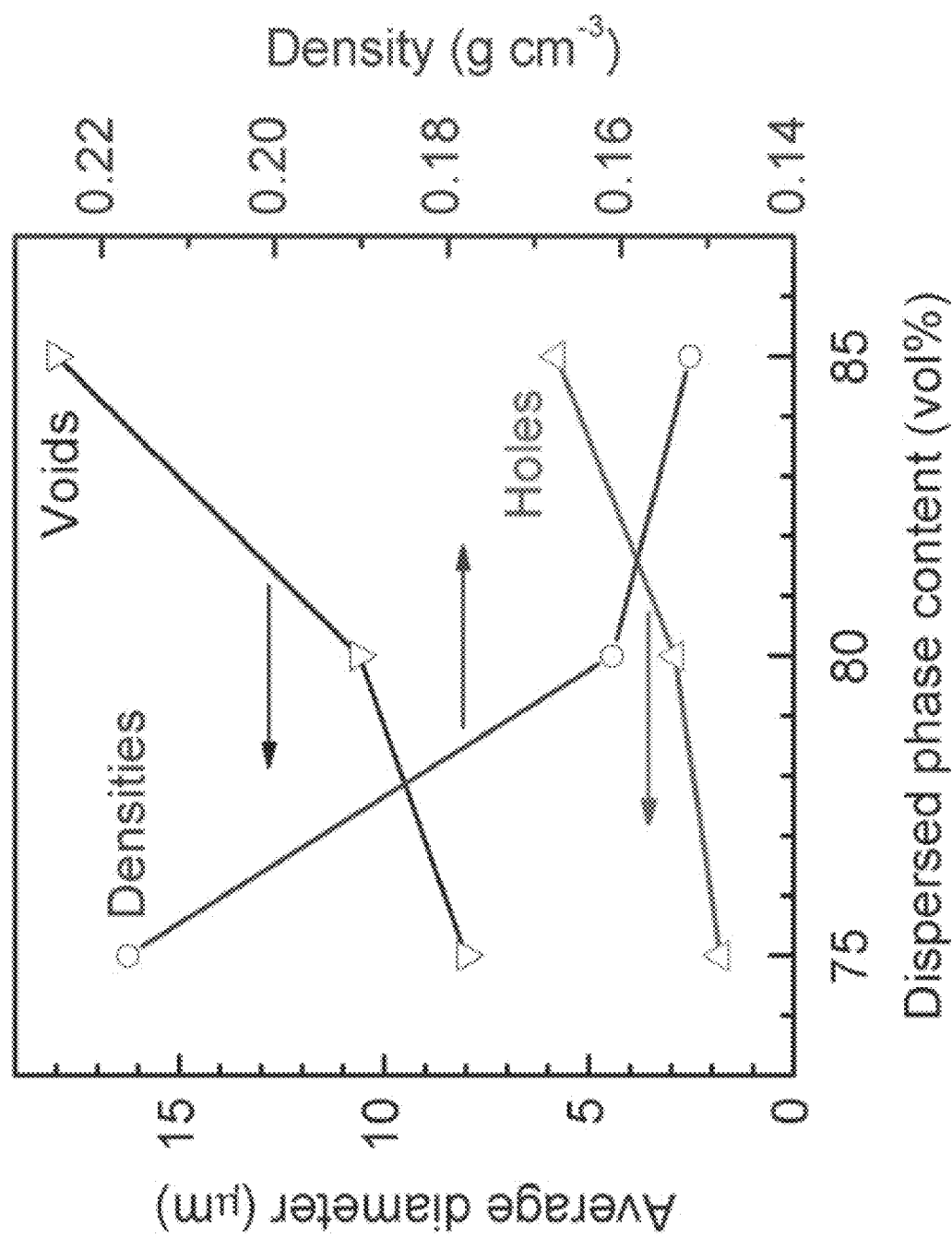
FIG. 2 presents a comparative plot showing average void diameters, the average interconnecting hole diameters, and the densities as a function of the HIPE's dispersed phase content in each of the exemplary PF-X superabsorbent structure sample series, according to some embodiments of the present invention.

Microstructure:

FIG. 2 presents a comparative plot showing average void diameters, the average interconnecting hole diameters, and the densities as a function of the HIPE's dispersed phase content in each of the exemplary PF-X superabsorbent structure series, according to some embodiments of the present invention.

As can be seen in FIG. 2, the densities of the PF-X varied from 0.152 to 0.217 g cm$^{-3}$, decreasing with the increase in the dispersed phase content. These densities are significantly higher than estimated from the HIPE recipes, reflecting some volume shrinkage during drying. The approach used for the fabrication of the PF-X is very different from that typically used for polyHIPEs from HIPE containing surfactants, monomers, and crosslinking comonomers, wherein here F-127-DMA served as the surfactant, the only polymerizable species, and the only crosslinking agent.

Figures 3A, 3B, 3C:
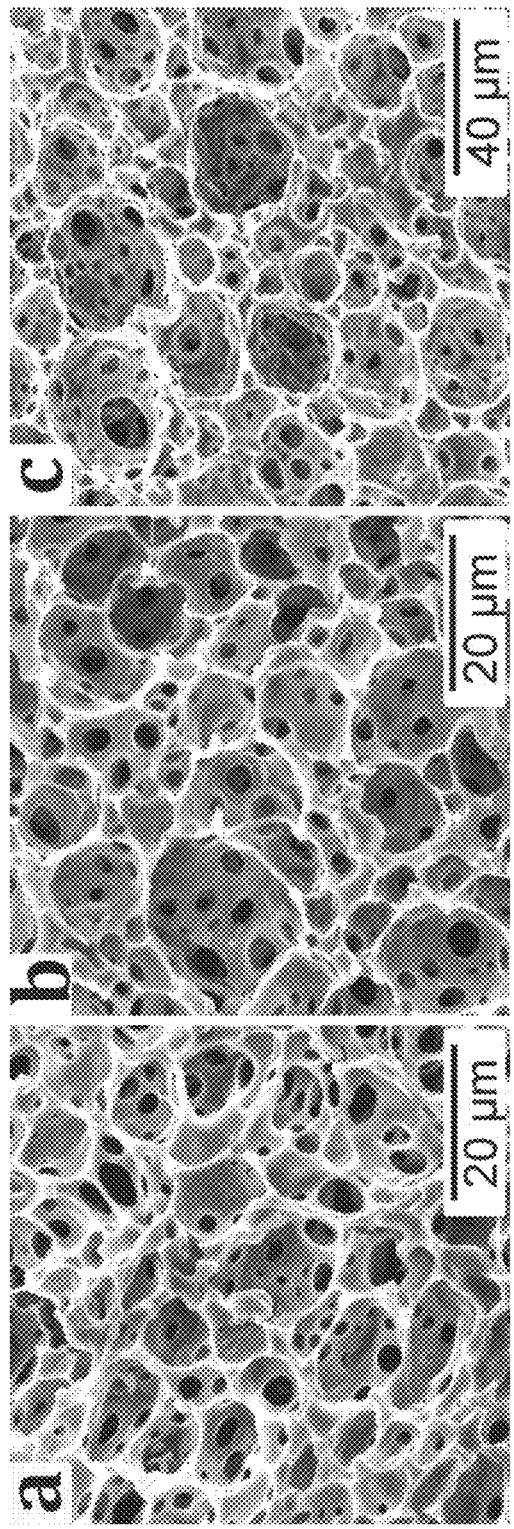
FIGS. 3A-C present scanning electron-micrographs (SEM) of PF-75 (FIG. 3A) PF-80 (FIG. 3B), and PF-85 (FIG. 3C)

FIGS. 3A-C present scanning electron-micrographs (SEM) of PF-75 (FIG. 3A) PF-80 (FIG. 3B), and PF-85 (FIG. 3C).

Figure 4A:
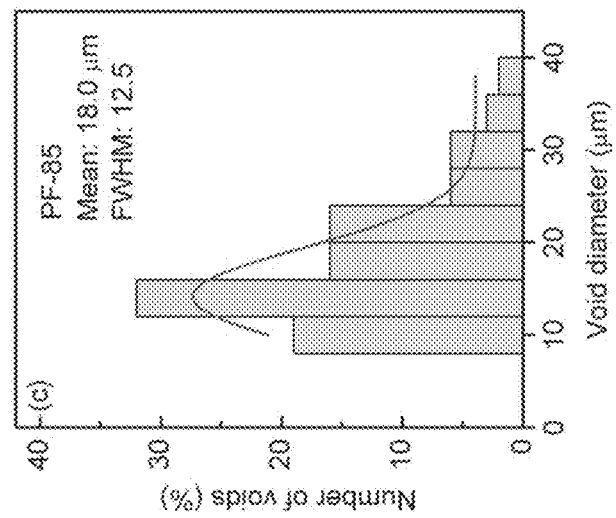
FIGS. 4A-C present the measured void diameter distributions in PF-75 (FIG. 4A) PF-80 (FIG. 4B), and PF-85 (FIG. 4C), as determined from the SEM micrographs, wherein the void diameter distributions include the mean measured diameter, whereas the mean measured diameter and the full width at half maximum (FWHM) were multiplied by 2/1.73, a correction factor for the random nature of the section, to yield the average void diameter.
Figure 4B:
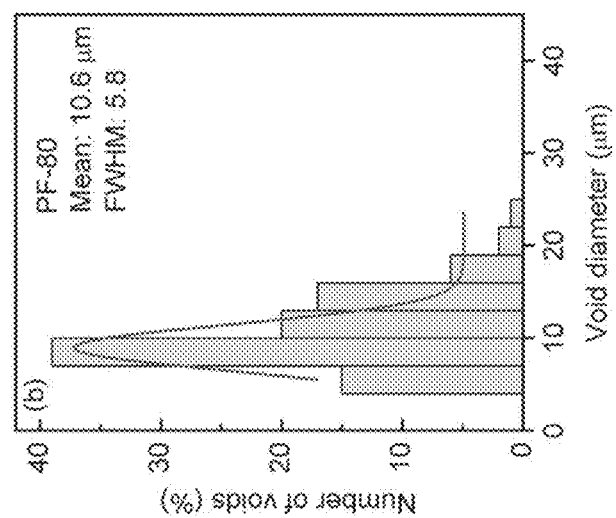
Figure 4C:
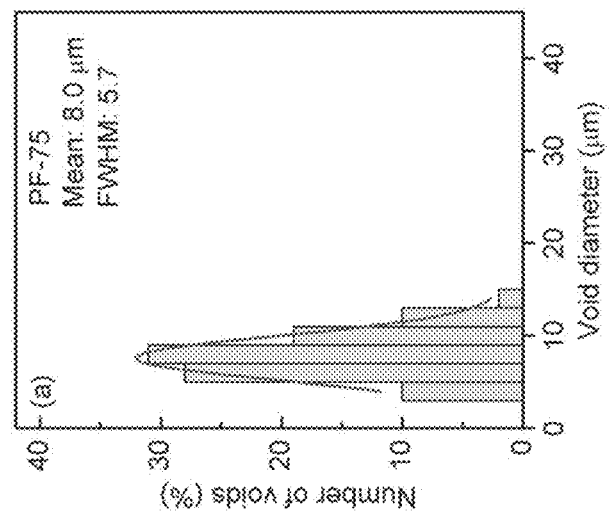

FIGS. 4A-C present the measured void diameter distributions in PF-75 (FIG. 4A) PF-80 (FIG. 4B), and PF-85 (FIG. 4C), as determined from the SEM micrographs, wherein the void diameter distributions include the mean measured diameter, whereas the mean measured diameter and the full width at half maximum (FWHM) were multiplied by 2/1.73, a correction factor for the random nature of the section, to yield the average void diameter.

As can be seen in FIGS. 4A-C, all the PF-X exhibited highly interconnected microstructures. The average void diameters ranged from 8.0 to 18.0 μm and the average interconnecting window (hole) diameters ranged from 1.8 to 5.8 μm. As can further be seen in FIGS. 4A-C, the average void diameters, the breadths of the distributions (the full width at half maximum), and the average interconnecting hole diameters, all increased with increasing dispersed phase content. The ratio of the average interconnecting hole diameter to the average void diameter ranged from 0.2 to 0.5, typical of surfactant-stabilized polyHIPEs.

Microphase Separation and Crystallinity

Figure 5B:
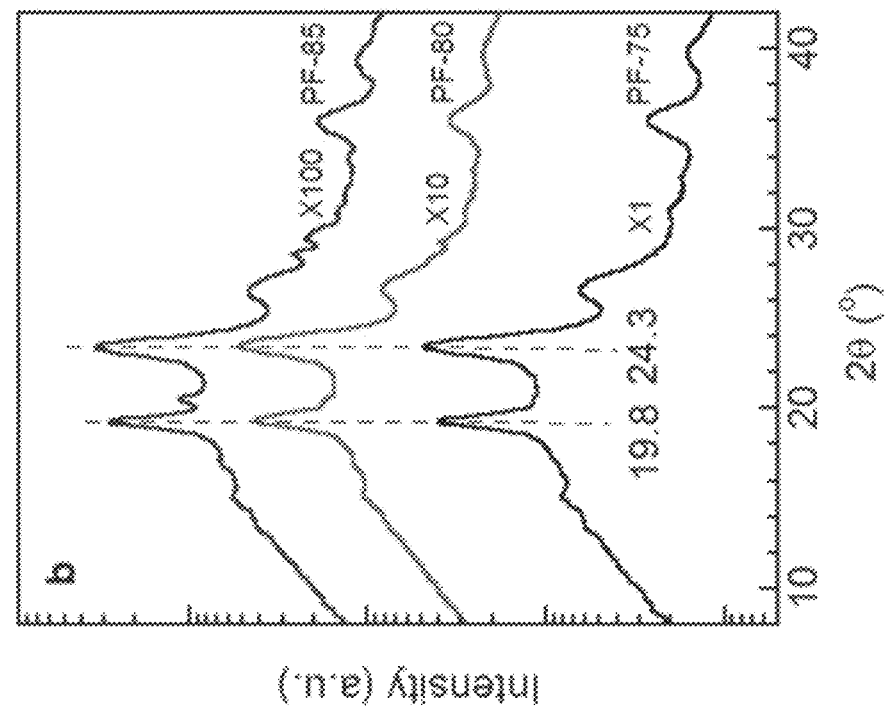
FIGS. 5A-B present comparative plots, comparing the small angle x-ray scattering (SAXS) profiles (FIG. 5A) and the wide angle x-ray scattering (WAXS) profiles (FIG. 5B) of the PF-X series.
Figure 5A:
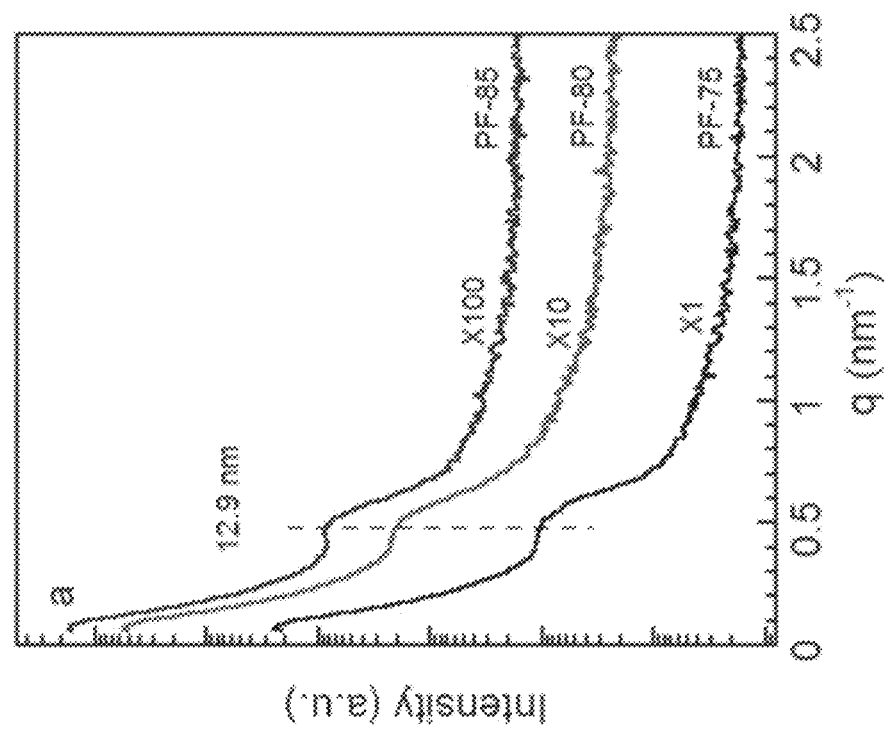

FIGS. 5A-B present comparative plots, comparing the SAXS profiles (FIG. 5A) and the WAXS profiles (FIG. 5B) of the PF-X series.

As can be seen in FIG. 5A, all the SAXS results from the PF-X exhibit a single broad peak that indicates the presence of microphase-separated PEO blocks and PPO blocks. The average distance between neighboring domains, based on the first-order scattering peak, was 12.9 nm. Interestingly, the microphase separation within the polyHIPE walls was relatively unaffected by the internal phase content. The relatively broad SAXS peaks indicate that the microphase-separated regions within the polyHIPE walls were not ordered. This experimental result backs the assumption that the self-assembly of domains of hydrophilic and hydrophobic sections occurs prior to polymerization/formation and crosslinking of the network, and confers the dual superabsorbency of the HIPE-templated superabsorbent structure presented herein, and possibly also the temperature-responsiveness and other properties.

As can be seen in FIG. 5B, the crystalline nature of the microphase separated regions within the polyHIPE walls is indicated by the narrow WAXS peaks. The PF-X crystallinity can be ascribed to domains of PEO sections and the similarities in the spectra indicate that the crystal structure of the domains was relatively unaffected by the internal phase content. The crystalline nature of the PEO blocks was confirmed through thermal analysis.

Figure 6A:
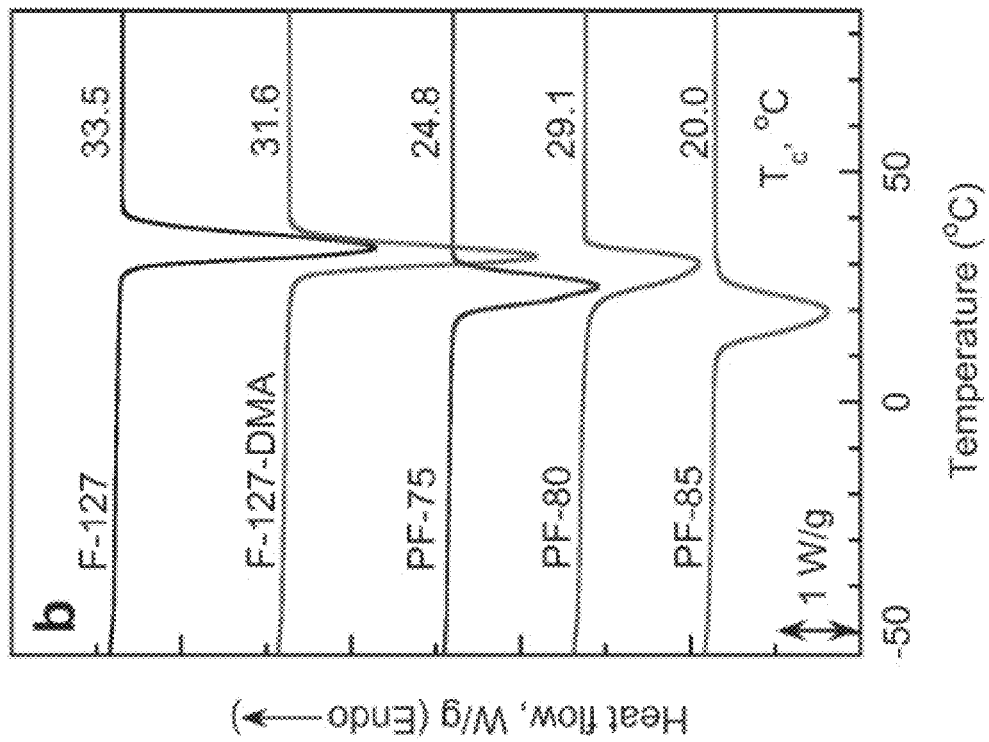
FIGS. 6A-B present differential scanning calorimetry (DSC) thermograms of F-127, F-127-DMA, and the PF-X series, wherein first heat is shown in FIG. 6A, and first cool is shown in FIG. 6B.
Figure 6B:
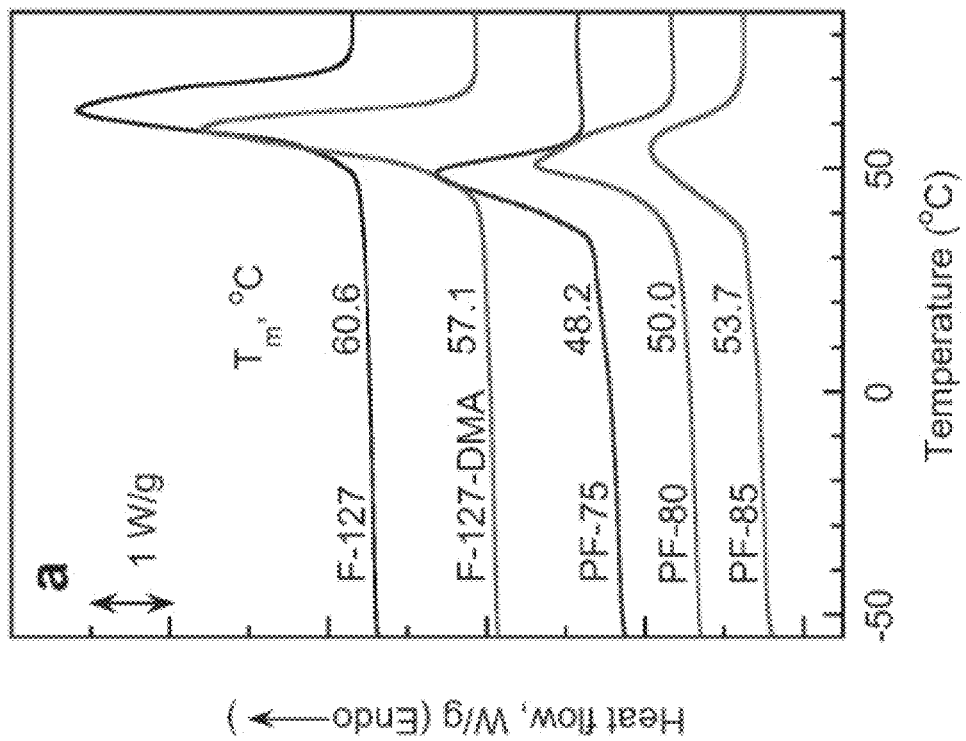

FIGS. 6A-B present DSC thermograms of F-127, F-127-DMA, and the PF-X sample series, wherein first heat is shown in FIG. 6A, and first cool is shown in FIG. 6B.

As can be seen in FIGS. 6A-B, the domains of PEO sections in the as-synthesized PF-X exhibited melting points ($T_m$) ranging from 48.9 to 53.2° C. The melting peaks were broad in comparison with those of F-127 and F-127-DMA, which exhibited $T_m$ of 62.8 and 59.0° C., respectively. The PF-X domains of PEO sections exhibited crystallization peaks between 20.0 and 29.1° C. that were lower and broader than those of F-127 and F-127-DMA, with peaks at 33.5 and 31.6° C., respectively.

The reduction and broadening of the melting and crystallization peaks reflect the reduction in the macromolecular mobility imposed by the reaction of the triblock copolymer ends and the formation of the crosslinked networks. The melting temperatures and heats of fusion ($\Delta H_m$) from the DSC thermograms for F-127, the as synthesized F-127-DMA, and the as-synthesized PF-X are summarized in Table 2.

TABLE 2

| Sample | $T_m$ (° C.) | $\Delta H_m$ (J $(g_{sample})^{-1}$) | $f_{PEO}$ (wt. %) | $\Delta H_m$ (J $(g_{PEO})^{-1}$) | $X_{c\text{-}PEO}$ (wt. %) |
|---|---|---|---|---|---|
| F-127 | 60.6 | −120.7 | 70 | −172.4 | 84.1 |
| F-127-DMA | 57.1 | −109.9 | 69 | −159.3 | 77.7 |
| PF-75 | 48.2 | −63.7 | 69 | −92.3 | 45.0 |
| PF-80 | 50.0 | −73.2 | 69 | −106.1 | 51.7 |
| PF-85 | 53.7 | −71.2 | 69 | −103.2 | 50.3 |

Estimates for the crystallinity of the domain of PEO sections ($X_c$, wt. %) were calculated by dividing $\Delta H_m$ by the 205 J g$^{-1}$ for perfectly crystalline PEO. The crystallinity of the domain of PEO sections in the PF-X, which varied from 45.0 to 51.7%, were significantly smaller than those of F-127 and F-127-DMA, 84.1 and 77.7 wt. %, respectively. The significant reduction in crystallinity, similar to the reduction in $T_m$, reflects the limitation on macromolecular mobility imposed by the crosslinking process. Table 3 below presents data of $T_c$, $\Delta H_c$, and $X_{c\text{-}PEO}$ of the PEO blocks for F-127, the as-synthesized F-127-DMA, and the as-synthesized PF-X. As can be seen in Table 3, the trends were identical for $T_c$ and $\Delta H_c$ as seen in Table 3.

TABLE 3

| Sample | $T_c$ (° C.) | $\Delta H_c$ (J $(g_{sample})^{-1}$) | $f_{PEO}$ (wt. %) | $\Delta H_c$ (J $(g_{PEO})^{-1}$) | $X_{c\text{-}PEO}$ (wt. %) |
|---|---|---|---|---|---|
| F-127 | 33.5 | 107.6 | 70 | 153.7 | 75.0 |
| F-127-DMA | 31.6 | 91.0 | 69 | 131.9 | 64.3 |
| PF-75 | 24.8 | 68.5 | 69 | 99.3 | 48.4 |
| PF-80 | 29.1 | 66.6 | 69 | 96.5 | 47.1 |
| PF-85 | 20.0 | 70.5 | 69 | 102.2 | 49.9 |

Figure 7:
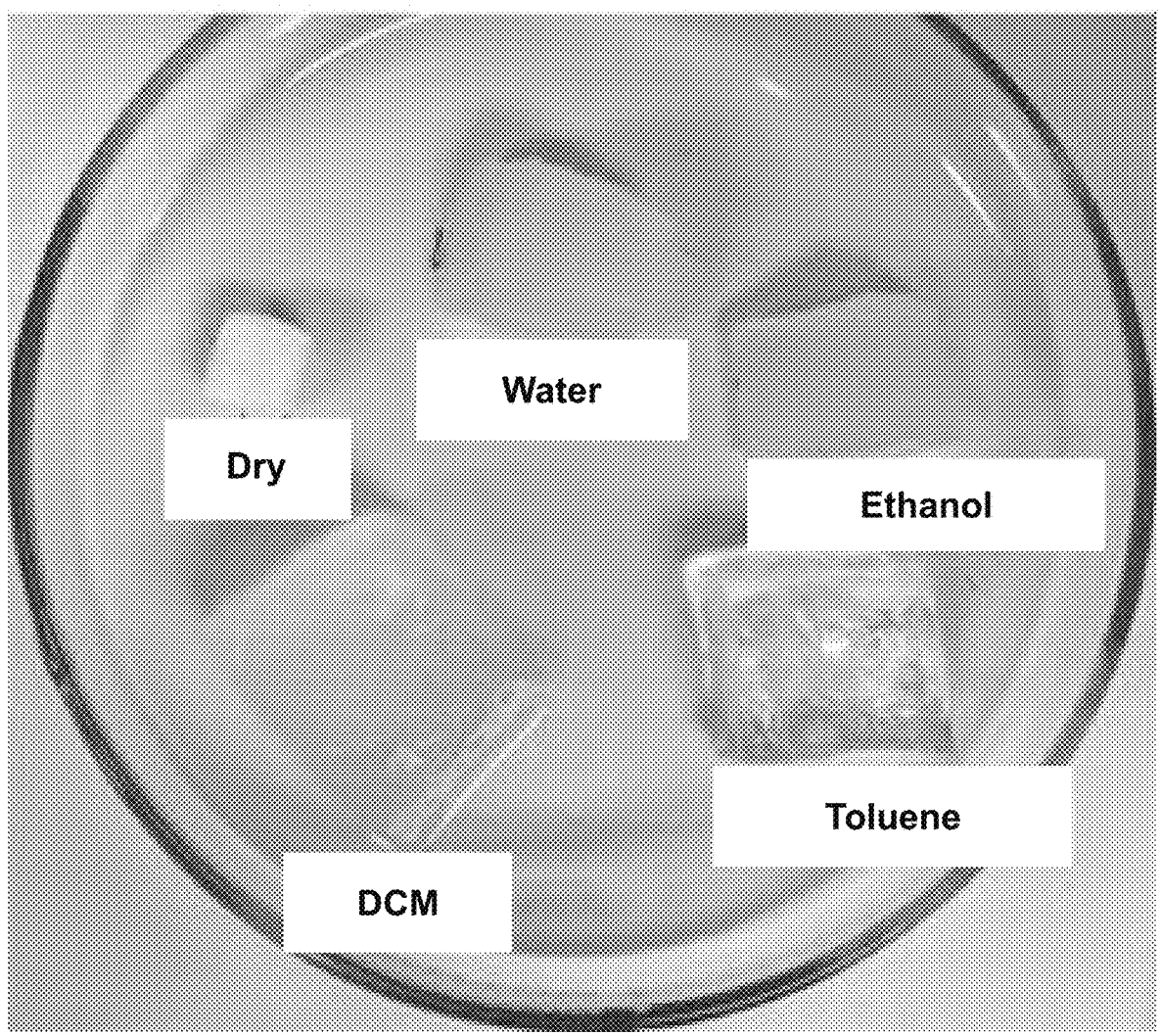
FIG. 7 is a photograph of five cubes of an emulsion-templated superabsorbent structure PF-85, according to some embodiments of the present invention, comparing between the dry sample, and samples of swollen structures that underwent equilibrium swelling in polar mediums water, and ethanol; and apolar mediums toluene, and dichloromethane (DCM)

Dual Liquid (Amphiphilic) Uptake:

FIG. 7 is a photograph of five cubes of an emulsion-templated superabsorbent structure (PF-85), according to some embodiments of the present invention, showing a comparison between the dry sample, and samples that underwent equilibrium swelling in a polar medium (water, ethanol); and in an apolar medium (toluene, dichloromethane (DCM)).

As can be seen in the volumetric uptakes presented in FIG. 7, the PF-X series of superabsorbent structures, according to some embodiments of the present invention, were able to swell in, and absorb both hydrophilic solvents (typical polar media, such as water and ethanol) and hydrophobic solvents (typical apolar media, such as toluene and DCM).

Figure 8A:
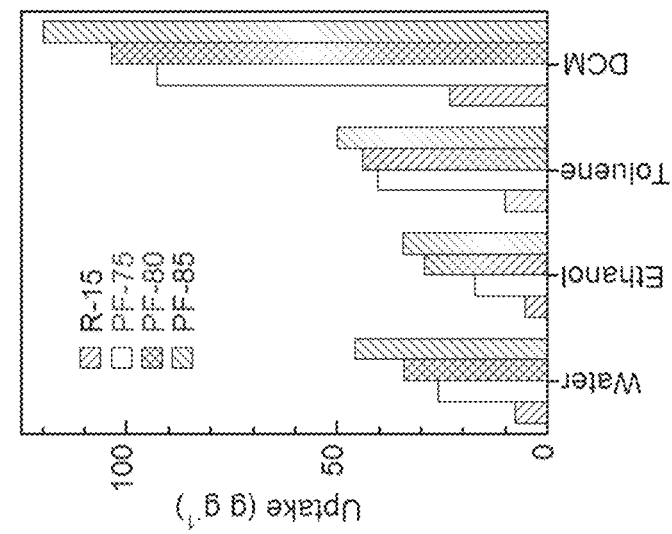
FIGS. 8A-C present comparative plots of uptakes (volumetric comparison) of various liquids in the PF-X series and in the reference R-15 (FIG. 8A), uptakes of various liquids in PF-85, normalized by the equilibrium uptake (FIG. 8B), and uptakes (mass-based comparison) of various liquids in the PF-X and in R-15 (FIG. 8C)
Figure 8B:
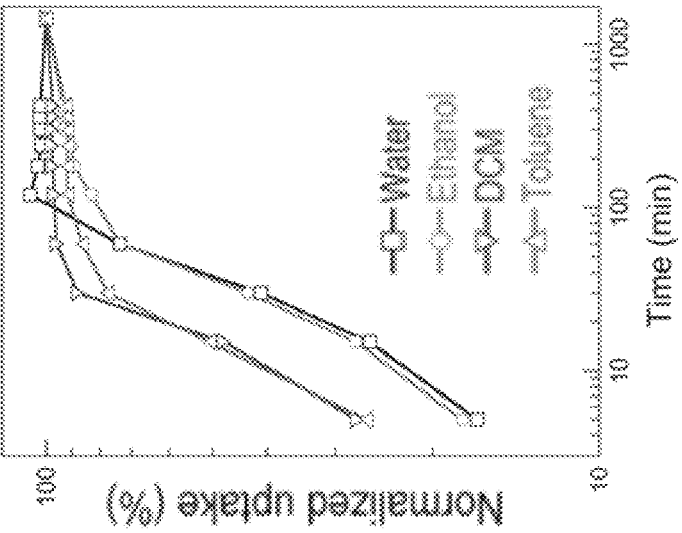
Figure 8C:
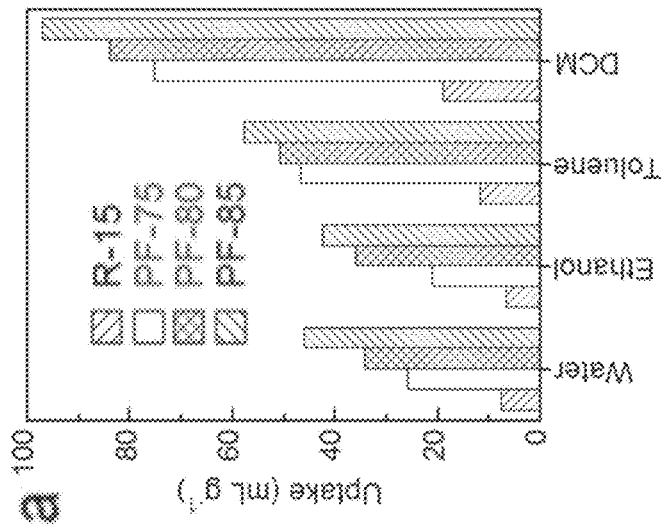

FIGS. 8A-C present comparative plots of uptakes (volumetric comparison) of various liquids in the PF-X series and in the reference R-15 (FIG. 8A), uptakes of various liquids in PF-85, normalized by the equilibrium uptake (FIG. 8B), and uptakes (mass-based comparison) of various liquids in the PF-X and R-15 (FIG. 8C).

As can be seen in FIGS. 8A-C, the uptake in the PF-X increased with the internal phase content, with PF-85 exhibiting the highest uptakes (46.0, 42.4, 57.8 and 97.1 mL g$^{-1}$ of water, ethanol, toluene and dichloromethane, respectively). The uptakes in the PF-X were at least four times higher than the uptakes in the corresponding R-15 (7.8, 6.7, 11.8 and 18.9 mL g$^{-1}$ of water, ethanol, toluene and dichloromethane, respectively). The notable water uptakes that were seen in HG-PHs are usually ascribed to the uptakes within the polyHIPE walls, within the original voids, and within the volume generated by hydrogel-swelling-driven void expansion. Similarly, the enhanced uptakes of both hydrophilic and hydrophobic liquids in the PF-X can be ascribed to the uptake in the original voids, in the walls and in the volume generated by PH-swelling-driven void expansion. The ability to absorb relatively large amounts of both hydrophilic and hydrophobic liquids makes the PF-X unique compared to known hydrogel polyHIPEs (HG-PHs), which tend to preferentially absorb hydrophilic liquids. The unique absorptions seen here for the PF-X reflect the solubility parameters of PEO and PPO which are quite similar to those of apolar solvents. It is noted herein that while PEO and PPO are both soluble in water, their solubility parameters are significantly lower than those of ethanol and water, and are similar to those of apolar solvents, indicating their greater solubility in apolar solvents (this has also been seen in R-15).

The normalized uptakes of water, ethanol, toluene and DCM seen in FIG. 8B (log-log plots of N(t)) are quite rapid and the equilibrium uptakes in PF-85 were reached in about two hours. The time at which the N(t) began to increase rapidly was strongly dependent on the nature of the liquid. The rapid increases in N(t) for the hydrophobic solvents (toluene, DCM) occurred after around 15 minutes and those of the hydrophilic solvents (water, ethanol) occurred at around 30 minutes. Based on the maximum slopes of the curves in FIG. 8B, the maximum uptake rates for the hydrophobic solvents are about twice those for the hydrophilic solvents. The uptakes, from about five minutes to a time that corresponds to 60% of the equilibrium uptake, can be described using a semi-empirical power-law equation $N(t) = kt^n$, where k is a constant, and n is a power-law exponent. For a thin, rectangular sample, n=0.5 represents Fickian diffusion, n=1 represents Case II diffusion, and anything between is termed anomalous diffusion. Based on the maximum slopes in FIG. 8B, which are about 0.6, the transport mechanism within the PF-85 during liquid uptake was anomalous, but strongly diffusive.

Figure 9A:
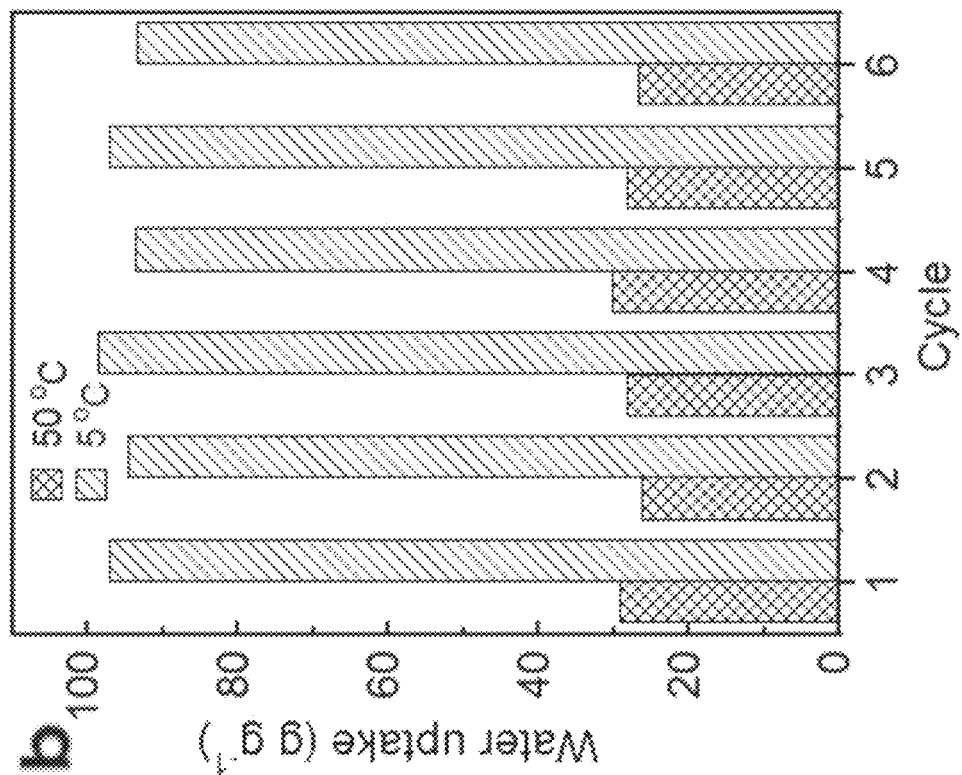
FIGS. 9A-B present comparative plots showing the water uptakes as a function of temperature (temperature response) as measured for the PF-X series and for the reference R-15 (FIG. 9A), and the water uptake cycles in PF-85, cooling from 50 to 5° C. and then heating from 5 to 50° C.
Figure 9B:
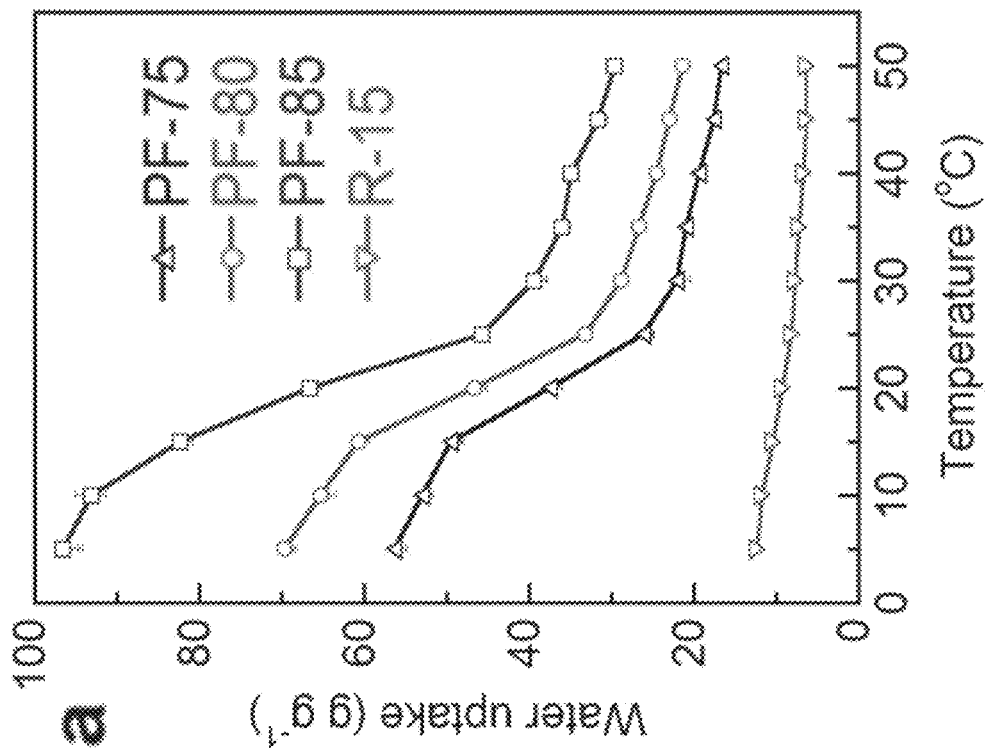

Amplified Temperature-Response:

FIGS. 9A-B present comparative plots showing the water uptakes as a function of temperature (temperature response) as measured for the PF-X series and for the reference R-15 (FIG. 9A), and the results of water uptake cycles in PF-85, cooling from 50 to 5° C. and then heating from 5 to 50° C. (FIG. 9B).

As can be seen in FIGS. 9A-B, the water uptake in swollen structures PF-X depends strongly on temperature, whereas the PF-X uptake at 50° C. is about 33% of that at 5° C. The water uptake decreased somewhat from 5 to 15° C., decreased much more significantly from 15 to 25° C., and then decreased somewhat from 25 to 50° C. While this temperature-responsive behavior is seen for all the PF-X, the water uptake and the water release on heating from 5 to 50° C. increased with increasing internal phase content.

The temperature-responsive water uptakes in the PF-X originate in the temperature-response of F-127, which has been reported elsewhere. R-15 exhibited a temperature response, with the uptake at 50° C. being 50% of that at 5° C. The significantly higher temperature sensitivity of the PF-X indicates that emulsion-templating amplifies the inherent F-127 temperature-response. The PF-X represent a novel type of highly responsive thermo-responsive porous hydrogel, quite different from those based on poly(N-isopropyl acrylamide). The temperature-responsive water uptakes in the PF-X exhibited a high degree of cyclability, with relatively constant PF-85 water uptakes during six heating-cooling cycles, as seen in FIG. 9B, at around 95.8 g g$^{-1}$ and 28.1 g g$^{-1}$ at 5 and 50° C., respectively.

Figure 10A:
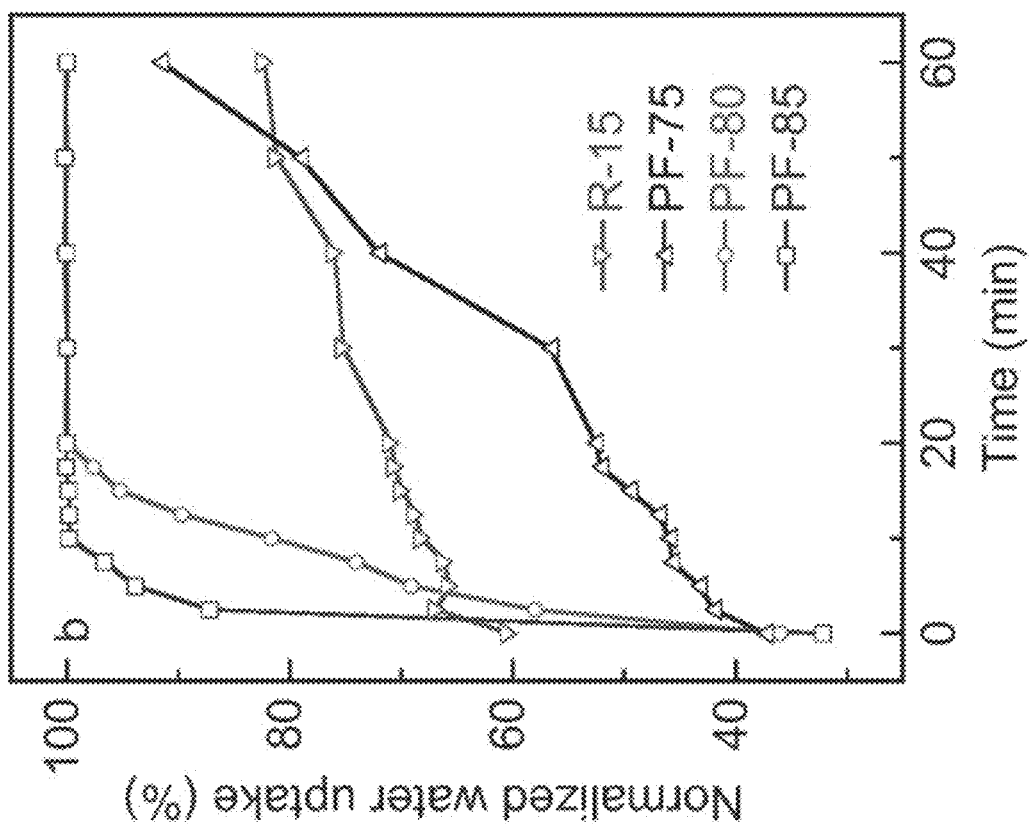
FIGS. 10A-B present comparative plots showing water uptakes in the PF-X series and in the reference R-15 normalized by the original uptake at 10° C., whereas heating from 10 to 45° C. is shown in FIG. 10A, and cooling from 45 to 10° C. is shown in FIG. 10B.
Figure 10B:
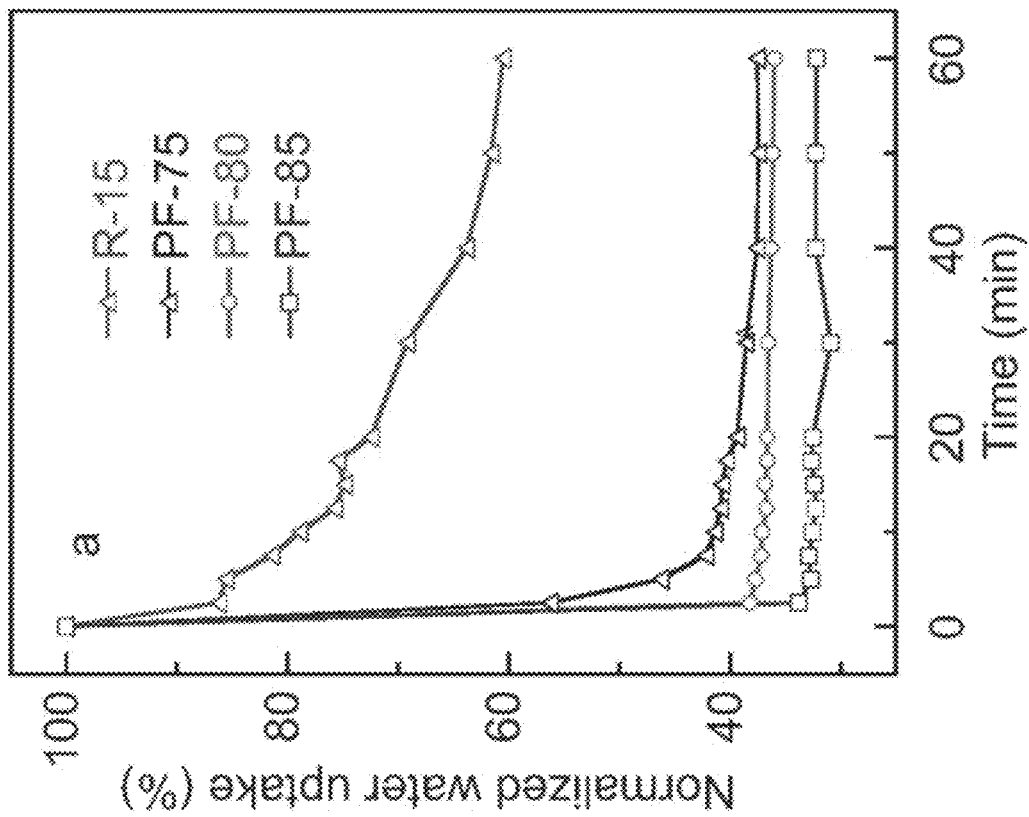

Accelerated Response Rate:

FIGS. 10A-B present comparative plots showing water uptakes in the PF-X sample series and in the reference R-15 normalized by the original uptake at 10° C., whereas heating from 10 to 45° C. is shown in FIG. 10A, and cooling from 45 to 10° C. is shown in FIG. 10B.

As can be seen in FIG. 10A, on heating from 10 to 45° C., the swollen PF-X reached their new equilibrium water uptakes within 5 to 15 minutes, with the response time decreasing with increasing internal phase contents (lower densities). In comparison, R-15 reached its new equilibrium uptake only after an hour. This difference in the time to reach equilibrium clearly demonstrates that the emulsion-templated superabsorbent structure, according to embodiments of the present invention, accelerates the response rates.

Accelerated response rates were also observed during cooling the emulsion-templated structures from 45 to 10° C. (FIG. 10B). PF-80 and PF-85 reached their new equilibrium water uptakes in 20 and 10 minutes, respectively. PF-75 and R15 had only reached 90 and 80% of their equilibrium, respectively, following 1 hour of water uptake. The water uptakes reached after cooling from 45 to 10° C. (FIG. 10B) were similar to the original uptakes at 10° C. (FIG. 10A), as seen for the temperature cyclability in FIG. 9B.

Example 3

Conclusions

The emulsion-templated PF-X were successfully synthesized within O/W HIPEs that were stabilized using the reactive copolymer F-127-DMA with no additional stabilizers, in a HIPE that did not contain additional monomers or additional crosslinking monomers. The high-porosity PF-X, with densities ranging from 0.15 to 0.22 g cm$^{-3}$, depending on the internal phase content, exhibited highly interconnected porous (open-cell) structures with average void diameters ranging from 8 to 18 μm and the average interconnecting hole diameters ranging from 1.8 to 5.8 μm. The average void diameter, the breadth of the void diameter distribution, and the average hole diameter all increased with increasing internal phase content. The PEO (exemplary more hydrophilic section) and PPO (exemplary more hydrophobic section) in the PF-X walls underwent microphase separation and the average 12.9 nm distance between neighboring sections was independent of the internal phase content. The PEO blocks in the microphase-separated structure were crystalline, with crystallinities of around 50%, melting points of around 50° C. and crystallization temperatures of around 25° C.

Regarding the relationship of the BCP to the various properties of the structure, it is noted herein that: (1) The ability to stabilize an emulsion and the amphiphilic uptake is related to the presence of both water-soluble and oil-soluble blocks (in F-127, the PEO block is both water-soluble and oil-soluble, while the PPO block is only oil-soluble; (2) The ability to phase separate into domains, which can take place to various extents in solution, during polymerization, and/or during solvent removal is related to the absolute lengths of the individual blocks, the relative lengths of the individual blocks (composition of the BCP), and the polymer-polymer compatibility; (3) The formation of a crosslinked network applies to all BCPs with reactive end-groups that are bifunctional; and (4) The variation of uptake with temperature is related to the nature of the individual polymer blocks.

The uptakes of both hydrophilic (typically polar media) and hydrophobic (typically apolar media) liquids by the PF-X, which increased with increasing internal phase content, were significantly higher than the uptakes within the corresponding reference polymerized F-127-DMA, reflecting the integral contribution of the PH-swelling-driven void expansion mechanism to the absorption behavior. Overall, the absorption of DCM was the highest (at around 97 mL g$^{-1}$) with the absorption decreasing in the following order: toluene, water, and ethanol. Interestingly, the absorption rates normalized by the equilibrium absorption for the hydrophobic solvents were around twice those for the hydrophilic solvents. The water uptakes in the PF-X were strongly temperature-responsive, with the uptakes decreasing with increasing temperature and varying reproducibly over several cycles. For the polyHIPE with the highest internal phase content, the uptake varied from around 96 g g$^{-1}$ at 5° C. to around 28 g g$^{-1}$ at 50° C. PH-swelling-driven void expansion not only amplified the extent of absorption, but also enhanced the sensitivity to temperature and accelerated the response rate to variations in temperature.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated as incorporated herein by reference. In addition, citation or identification of any reference in this application shall not be construed as an admission that such reference is available as prior art to the present invention. The section headings should not be construed as necessarily limiting.

In addition, any priority document(s) of this application is/are hereby incorporated herein by reference in its/their entirety.

What is claimed is:

1. A superabsorbent structure, comprising a covalently crosslinked copolymer having a microstructure templated by an external phase of a high internal phase emulsion (HIPE), wherein said crosslinked copolymer is characterized by:
    a) at least one network of covalently crosslinked chains, said crosslinked chains comprise hydrophobic sections and hydrophilic sections, each of said sections is a continuous chain of at least five residues long;
    b) a ratio of residues of said hydrophilic sections to residues of said hydrophobic sections, ranging from 1:9 to 9:1; and
    c) a total of said residues of said hydrophilic sections and said residues of said hydrophobic sections that is at least 30% of a total of residues in said network,
    said crosslinked copolymer is capable of swelling in a polar medium and in an apolar medium, and
    wherein said network comprises contiguous chains of at least one hydrophilic section and at least one hydrophobic section.

2. The structure of claim 1, wherein, said contiguous chains are separated by at least one residue of a crosslinking monomer.

3. The structure of claim 1, wherein said contiguous chain is selected from the group consisting of a diblock copolymer, a triblock copolymer, and an alternating multiblock copolymer.

4. The structure of claim 3, wherein said triblock copolymer comprises two of said hydrophilic sections separated by said hydrophobic section.

5. The structure of claim 4, wherein each of said sections is at least 60 residues long.

6. The structure of claim 5, wherein said ratio of residues of said hydrophilic sections to residues of said hydrophobic sections, is about 3:1.

7. A swollen structure comprising the superabsorbent structure of claim 1 and said polar medium and/or said apolar medium absorbed thereby.

8. An article of manufacturing comprising the superabsorbent structure of claim 1.

9. The article of claim 8, selected from the group consisting of a basic solution retention device, an acidic solution retention device, a cosmetic product, a diaper, a filter material, matrix or device, a flood/spill control material or device, a grooming product, a liquid waste material or device, a personal care and/or hygiene product, a surgical pad, a water purification material, matrix or device, a water retention material or containing device, a wound dressing, an incontinence garment, and an ion-exchange material, matrix or device.

10. A process of preparing the superabsorbent structure of claim 1, the process comprising subjecting a high internal phase emulsion (HIPE) having an internal phase and an external phase to polymerization of said external phase, wherein said internal phase and/or said polymerizable external phase comprises a plurality of polymerizable precursors of said sections.

11. The process of claim 10, wherein said external phase is an aqueous external phase and said internal phase is an organic internal phase.

12. The process of claim 10, wherein said aqueous external phase comprises said plurality of polymerizable precursors of said sections.

13. The process of claim 10, wherein said polymerizable precursors of said sections comprises at least one bifunctional end-group.

14. The process of claim 13, wherein said polymerizable precursors of said sections comprises two bifunctional end-groups.

15. The process of claim 10, wherein said HIPE further comprises a plurality of monomers.

16. The process of claim 10, wherein said HIPE is essentially devoid of a crosslinking agent that is not a part of said plurality of polymerizable precursors.

17. The process of claim 10, wherein said HIPE further comprises at least one crosslinking agent.

18. The process of claim 10, wherein said HIPE is essentially devoid of a HIPE-stabilizing agent that is not a part of said plurality of polymerizable precursors.

19. The process of claim 10, wherein said HIPE further comprises a HIPE-stabilizing agent.

20. The process of claim 10, wherein said external phase is an aqueous external phase that comprises said plurality of polymerizable precursors of said sections, each of said polymerizable precursors of said sections comprises sections of hydrophilic and hydrophobic homopolymers, and each having two bifunctional end-groups.

* * * * *